United States Patent
Khan et al.

(10) Patent No.: US 12,309,270 B2
(45) Date of Patent: May 20, 2025

(54) ENABLING A SECURING OF CRYPTOGRAPHIC OPERATIONS

(71) Applicant: International Business Machines Corporation, Armonk, NY (US)

(72) Inventors: Muhammad Usman Karim Khan, Karlsruhe (DE); Timo Kussmaul, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 18/140,687

(22) Filed: Apr. 28, 2023

(65) Prior Publication Data

US 2024/0333497 A1 Oct. 3, 2024

(51) Int. Cl.
*H04L 9/08* (2006.01)
*H04L 9/40* (2022.01)

(52) U.S. Cl.
CPC .......... *H04L 9/0891* (2013.01); *H04L 9/0822* (2013.01); *H04L 9/0861* (2013.01); *H04L 9/0877* (2013.01); *H04L 9/088* (2013.01); *H04L 63/06* (2013.01)

(58) Field of Classification Search
CPC ... H04L 9/0891; H04L 9/0822; H04L 9/0861; H04L 9/0877; H04L 9/088; H04L 63/06
See application file for complete search history.

(56) References Cited

U.S. PATENT DOCUMENTS

| | | | |
|---|---|---|---|
| 9,531,533 B2 | 12/2016 | Ronca | |
| 9,647,998 B2 | 5/2017 | Ronca | |
| 10,298,388 B2 | 5/2019 | Bower, III | |
| 2017/0317833 A1 | 11/2017 | Smith et al. | |
| 2018/0077138 A1* | 3/2018 | Bansal | G06Q 20/325 |

(Continued)

FOREIGN PATENT DOCUMENTS

| | | |
|---|---|---|
| EP | 2232759 A1 | 8/2018 |
| WO | 2019245676 A1 | 12/2019 |
| WO | 2022133860 A1 | 6/2022 |

OTHER PUBLICATIONS

"Patent Cooperation Treaty PCT Notification of Transmittal of the International Search Report and the Written Opinion of the International Searching Authority, or the Declaration", International application No. PCT/EP2024/057854, International filing date Mar. 22, 2024, Date of mailing Jun. 14, 2024, 12 pages.

(Continued)

*Primary Examiner* — Shirley X Zhang
(74) *Attorney, Agent, or Firm* — Stephen R. Yoder

(57) ABSTRACT

The present disclosure relates to a method for enabling a securing of cryptographic operations executed by a stateless hardware security module for a client workload, the method comprises a key generation request from the client workload and an attestation document, verifying the key generation request and attestation document, determining workload requirements for the client workload, generating a cryptographic key and encoding the determined workload requirements as attributes of the generated cryptographic key. The generated cryptographic key and the attributes, which are cryptographically secured using a hardware security module key, are returned to the client workload.

20 Claims, 9 Drawing Sheets

(56) References Cited

U.S. PATENT DOCUMENTS

2020/0021430 A1    1/2020    Grubin et al.
2020/0412540 A1   12/2020    Sabath et al.
2022/0158856 A1    5/2022    Maximov
2022/0222099 A1    7/2022    Srivastava et al.
2023/0021749 A1    1/2023    Lidzborski

OTHER PUBLICATIONS

Savagaonkar, "Titan in depth: Security in plaintext," Google Cloud, Aug. 25, 2017, 10 pages, https://cloud.google.com/blog/products/identity-security/titan-in-depth-security-in-plaintext?hl=en.

"Verifying attestations," Last updated Nov. 18, 2022 UTC, Printed Apr. 26, 2023, 8 pages, https://cloud.google.com/kms/docs/attest-key.

Visegrady et al., "Stateless cryptography for virtual environments," Research Gate, IBM Journal of Research and Development, Jan. 2014, 11 pages, https://www.researchgate.net/publication/260721363.

"Attestation," IBM, Virtual Private Cloud (VPC), Last Updated Mar. 20, 2023, 10 pages, https://cloud.ibm.com/docs/vpc?topic=vpc-about-attestation.

"Enabling a Securing of Cryptographic Operations," Application No. GB23004565.1, Filed Mar. 29, 2023.

"Patents Act 1977 Combined Search and Examination Report under Section 17 & 18(3)", Application No. GB2304565.1, Date of report: Sep. 28, 2023, 6 pages.

\* cited by examiner

ENABLING A SECURING OF CRYPTOGRAPHIC OPERATIONS

BACKGROUND

The present invention relates to the field of digital computer systems, and more specifically, to a method for enabling a securing of cryptographic operations executed by a stateless hardware security module for a client workload.

Stateless hardware security modules may be used executing cryptographic operations for client workloads. However, the securing of cryptographic operations executed by a stateless hardware security module for a client workload may be a challenging task.

SUMMARY

Various embodiments provide a method for enabling a securing of cryptographic operations executed by a stateless hardware security module for a client workload, a computer program product and a stateless hardware security module as described by the subject matter of the independent claims. Advantageous embodiments are described in the dependent claims. Embodiments of the present invention can be freely combined with each other if they are not mutually exclusive.

In one aspect, the invention relates to a method for enabling a securing of cryptographic operations executed by a stateless hardware security module for a client workload. The method comprises receiving by the hardware security module a key generation request from the client workload. The hardware security module receives an attestation document for the key generation request signed by a first attestation service using a first cryptographic attestation signing key. The hardware security module verifies the key generation request and attestation document using a set of one or more pre-defined requirements of a workload assigning policy. The hardware security module, upon successful verification of the key generation request and the attestation document for the key generation request, determines a set of one or more workload requirements for the client workload. The hardware security module generates a first cryptographic key of the client workload to be used by the hardware security module for providing cryptographic operations for the client workload and encoding the one or more workload requirements as one or more attributes of the generated first cryptographic key of the client workload for assigning a usability of the generated first cryptographic key to cryptographic operation requests by the client workload. The hardware security module returns the generated first cryptographic key of the client workload with the one or more attributes of the generated first cryptographic key to the client workload. The generated first cryptographic key of the client workload with the one or more attributes of the generated first cryptographic key is cryptographically secured using a hardware security module key.

In another aspect the invention relates to a computer program product for enabling a securing of cryptographic operations executed by a stateless hardware security module for a client workload. The computer program product comprises a computer-readable storage medium having computer-readable program code embodied therewith. The computer-readable program code is configured to implement a method, which comprises receiving by the hardware security module a key generation request from the client workload. The hardware security module receives an attestation document for the key generation request signed by a first attestation service using a first cryptographic attestation signing key. The hardware security module verifies the key generation request and attestation document using a set of one or more pre-defined requirements of a workload assigning policy. The hardware security module, upon successful verification of the key generation request and the attestation document for the key generation request, determines a set of one or more workload requirements for the client workload. The hardware security module generates a first cryptographic key of the client workload to be used by the hardware security module for providing cryptographic operations for the client workload and encoding the one or more workload requirements as one or more attributes of the generated first cryptographic key of the client workload for assigning a usability of the generated first cryptographic key to cryptographic operation requests by the client workload. The hardware security module returns the generated first cryptographic key of the client workload with the one or more attributes of the generated first cryptographic key to the client workload. The generated first cryptographic key of the client workload with the one or more attributes of the generated first cryptographic key is cryptographically secured using a hardware security module key.

In another aspect the invention relates to a stateless hardware security module for enabling a securing of cryptographic operations executed by the hardware security module for a client workload. The hardware security module is configured for receiving a key generation request from the client workload. The hardware security module is further configured for receiving an attestation document for the key generation request signed by a first attestation service using a first cryptographic attestation signing key. The hardware security module is further configured for verifying the key generation request and attestation document using a set of one or more pre-defined requirements of a workload assigning policy. The hardware security module is further configured for determining, upon successful verification of the key generation request and the attestation document for the key generation request, a set of one or more workload requirements for the client workload. The hardware security module is further configured for generating a first cryptographic key of the client workload to be used by the hardware security module for providing cryptographic operations for the client workload and encoding the one or more workload requirements as one or more attributes of the generated first cryptographic key of the client workload for assigning a usability of the generated first cryptographic key to cryptographic operation requests by the client workload. The hardware security module is further configured for returning the generated first cryptographic key of the client workload with the one or more attributes of the generated first cryptographic key to the client workload. The generated first cryptographic key of the client workload with the one or more attributes of the generated first cryptographic key is cryptographically secured using a hardware security module key.

BRIEF DESCRIPTION OF THE DRAWINGS

In the following embodiments of the invention are explained in greater detail, by way of example only, making reference to the drawings in which.

DETAILED DESCRIPTION

Figure 1:
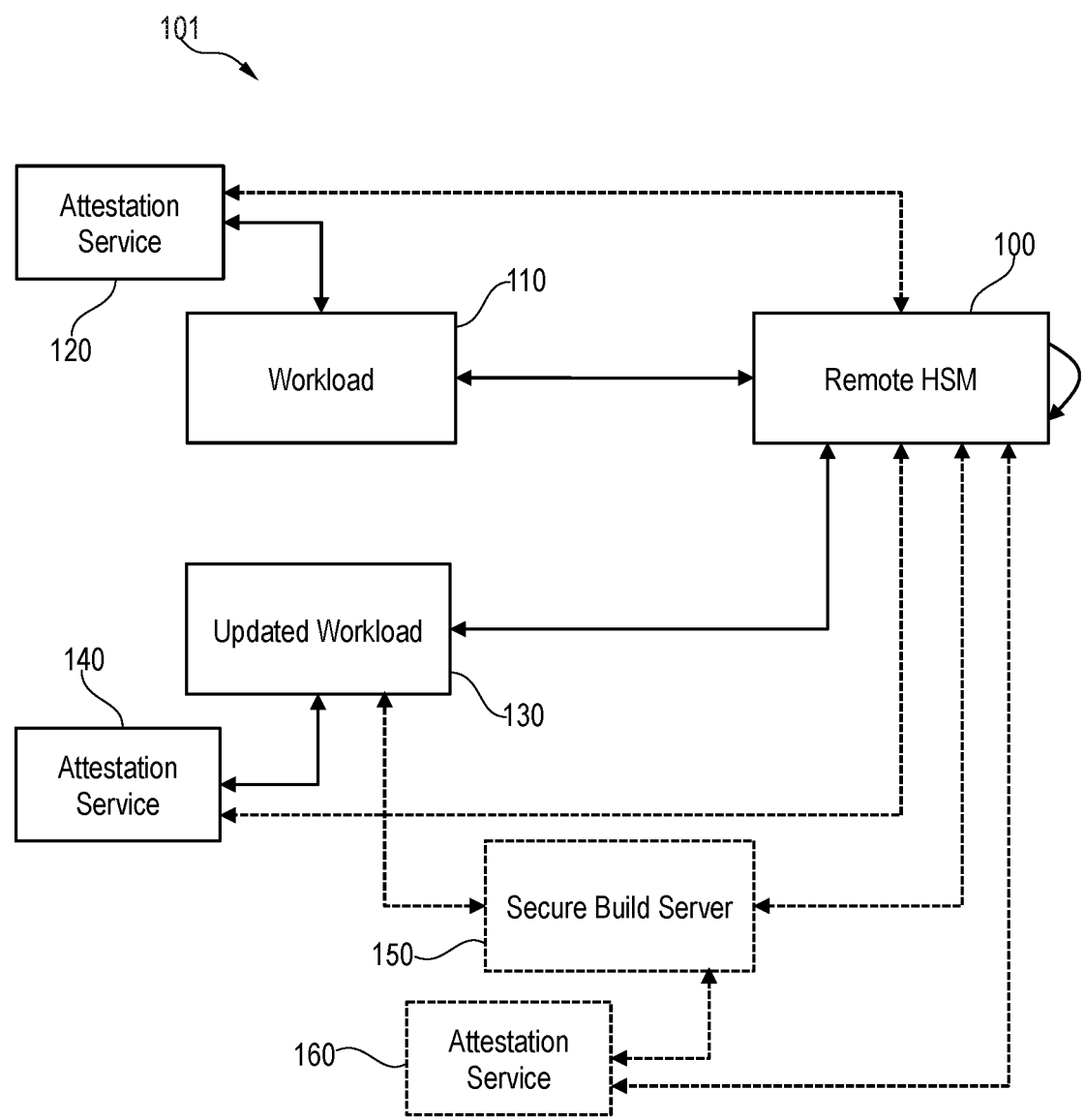
FIG. 1 is a block diagram of a system comprising a stateless hardware security module in accordance with an example of the present subject matter.

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The hardware security module (HSM) considered herein is a stateless HSM, in particular a remote stateless HSM. The method described herein enables an implementation of an attention-based workload-scoping of cryptographic keys in such a stateless HSM. The attention-based workload-scoping of cryptographic keys in the stateless HSM may enable additional protection of sensitive cryptographic keys compared to known approaches. Thus, a higher level of protection of cryptographic key to be used by a stateless HSM against attacks, e.g., based on malicious client workloads, may be achieved.

A client of the HSM refers to a system, i.e., computer system, which sends a request to the HSM, like the client role in the client server model. A client workload refers to a container image, program, software, and/or application that runs on the client and which implements the sending of the request and the processing of the response.

Cryptographic keys generated by the HSM for a client workload may be provided by the HSM together with attributes assigned to the generated cryptographic keys by the HSM in form of a cryptographically secured datasets, also referred to as a key blob. Such a dataset, i.e., key blob, may, e.g., be encrypted by the HSM with a HSM key such that only the HSM is enabled to decrypt and use the generated cryptographic key with the attributes of the cryptographic key comprised by the respective dataset. Since the HSM is a stateless HSM, the key blob comprising the cryptographic key with the attributes of the cryptographic key generated for the client workload may be sent to the client workload by the HSM for storage. In case the cryptographic key is required for a cryptographic operation to be executed by the HSM for the client workload, the client workload may, e.g., sent the encrypted key blob to the HSM. The HSM may, e.g., decrypt the encrypted key blob and check using the attributes, whether the cryptographic key comprised by the key blob is indeed assigned to the client workload requesting the cryptographic operation. In other words, it is checked, whether the client workload is allowed to use the key blob, i.e., the cryptographic key comprised by the key blob. In case the check is positive, the HSM may execute the requested cryptographic operation using the cryptographic key comprised by the key blob provided by the client workload requesting the cryptographic operation.

Using the attributes comprising workload requirements for the client workload, a usability of the generated cryptographic key may be assigned to cryptographic operation requests by the client workload. This workload-scoping of the cryptographic key via the attributes may scope the cryptographic key to an individual client workload. In other words, the cryptographic key is generated for an individual client workload and usability may be restricted to this individual client workload via the attributes. Thus, only the client workload, to which the cryptographic key has been scoped, may be able to successfully request any usage of this cryptographic key by the HSM. Another client workload, e.g., a malicious client workload, which comes into position of a cryptographically secured cryptographic key, which is not scoped to this other client workload, may be unable to use the cryptographic key, e.g., for requesting cryptographical operation by the HSM. The attestation, e.g., an attestation document provided for the other malicious client workload may reveal the it is not the same client workload, to which the cryptographic key has been scoped, since the attestation document for the other malicious client workload will in general be different form an attestation document provided for the client workload, to which the cryptographic key has been scoped.

Attestation mechanisms may be used to prevent tampering of the scoping mechanism. For example, a tampered client workload may not be able to use a cryptographic key, which has been scoped to an untampered client workload. The attestation, e.g., an attestation document provided for the tampered client workload may reveal the tampering of the client workload, since it will in general be different form an attestation document provided for the untampered client workload. Thus, neither a tampered version of the original client workload, nor another malicious client workload may be able to use a cryptographic key generated for the original untampered client workload.

Potential attack vectors, against which the attention-based workload-scoping of cryptographic keys in a stateless HSM may provide protection, comprise, e.g., a malicious actor, like e.g., a malicious administrator, which steals a key blob generated for an individual client workload by the HSM, e.g., from an external storage, and inserts the stolen key blob into a malicious client workload. The malicious client workload may be created by the malicious actor, e.g., to sign malicious transactions. The malicious client workload may try to use the stolen key blob to request a cryptographic operation by the HSM, e.g., to authorize a malicious transaction using the cryptographic key comprised by the stolen key blob. Checking an attestation document provided for the malicious client workload, which will be different from an attestation document provided for the client workload, for which the cryptographic key comprised by the stolen key blob has been generated and to which the workload requirements encoded into the attributes restricts the usability of the cryptographic key. Therefore, the attestation document provided for the malicious client workload will not satisfy the workload requirements encoded into the attributes comprised by the key blob and the HSM will refuse execution of the requested cryptographic operation, e.g., authorizing a malicious transaction.

Another potential attack vector, against which the attention-based workload-scoping of cryptographic keys in a stateless HSM may provide protection, is a tampered client workload. A malicious actor, like e.g., a malicious administrator, may tamper a client workload comprising a key blob generated for this client workload, e.g., by inserting and/or modifying code into/of the client workload to sign malicious transactions using the key blob of the untampered client workload. The tampered code of the client workload, when being executed, may try to use the key blob to request a cryptographic operation by the HSM, e.g., to authorize a malicious transaction using the cryptographic key comprised by the key blob. Checking an attestation document provided for the tampered client workload, which will be different from an attestation document provided for the untampered client workload, due to the differences in the code caused by the tampering. Therefore, the attestation document provided for the tampered client workload will not satisfy the workload requirements encoded into the attributes comprised by the key blob generated for the untampered client workload and the HSM will refuse execution of the requested cryptographic operation, e.g., authorizing a malicious transaction.

By checking an attestation document provided for a client workload using the workload assigning policy, the HSM is enabled to recognize and reject vulnerable client workloads and/or client workloads deployed to vulnerable execution environments. Furthermore, by checking an attestation document provided for a client workload requesting a usage of a cryptographic key comprised by a key blob using attributes assigned to the cryptographic key and provided by the key blob, the HSM is enabled to recognize or reject malicious and/or tampered client workloads and/or client workloads deployed to malicious and/or tampered execution environments.

Furthermore, a controlled handover of cryptographic keys between different versions of a client workload may, e.g., be enabled. Thus, an updating of a client workload may be enabled.

The attention-based workload-scoping of cryptographic keys in a stateless HSM may enable one or more of the following beneficial effects: An additional layer of protection may be provided for cryptographic keys by assigning attributes to the cryptographic keys, which encode workload requirements scoping the usability of the respective cryptographic key to an individual client workload. An authorization to use the cryptographic key may be proven using an attestation document generated for the individual client workload and verifiable using the attributes assigned to the cryptographic key. The cryptographic keys and the stateless HSM may be protected against potential attack vectors, like the ones outlined above. Typical DevOps, like client workload updates', are not impeded. DevOps refer to a set of practices intended to reduce time between committing a change to a system and the change being placed into normal production, while ensuring high quality. DevOps may be characterized by one or more of the following key principles: shared ownership, workflow automation, and rapid feedback. DevOps refer to a methodology in the software development and IT industry, using a set of practices and tools to integrate and automate the work of software development (Dev) and IT operations (Ops) as a means for improving and shortening the systems development life cycle. DevOps may be complementary to agile software development with several DevOps aspects coming from the agile way of working.

The attention-based workload-scoping of cryptographic keys in a stateless HSM may further enable new kinds of licensing of cryptographic keys per client workload for HSMs and cloud crypto services. Furthermore, the attention-based workload-scoping of cryptographic keys in a stateless HSM may be combined with, e.g., with confidential computing secure build offering, e.g., provided by a secure build server. Finally, a new type of cryptographic key licensing and pricing may be implemented. For example, a cryptographic key may be priced per cryptographic key usage and/or per client workload.

The first local attestation service may, e.g., be a local attestation service. Such a local attestation service may, e.g., be implemented as a component of an execution environment, within which the client workload is executed. The first local attestation service may use a first cryptographic attestation signing key for signing attestation documents. The first cryptographic attestation signing key may be trusted by the HSM. The HSM may, e.g., be provided with a first cryptographic attestation signature verification key. For example, the first cryptographic attestation signing key is a cryptographic private key of a first asymmetric cryptographic key pair. The first asymmetric cryptographic key pair may further comprise a cryptographic public key, which is provided to the HSM as the first cryptographic attestation signature verification key. For example, first cryptographic attestation signature verification key is provided to the HSM as part of a digital certificate of the first attestation service.

The hardware security module key may, e.g., be a domain master key of the HSM. For example, the HSM key may be a symmetric or an asymmetric cryptographic key. For cryptographically securing data, e.g., keys generated by the HSM and/or attributes for such keys, the HSM may encrypt the data using the hardware security module key. The HSM key used for encryption may, e.g., be a public cryptographic key of an asymmetric cryptographic key pair of the HSM. The asymmetric cryptographic key pair of the HSM may further comprise a private cryptographic key of the HSM, which is required to be used for decrypting data encrypted using the public cryptographic key of the HSM. Using the HSM key for encrypting data, e.g., a symmetric cryptographic key of the HSM or a public cryptographic key of the HSM, may ensure that only the HSM is enabled to decrypt the encrypted data. Access to the symmetric cryptographic key of the HSM or the public cryptographic key of the HSM may be restricted to the HSM.

The stateless HSM may, e.g., be implemented as a EP11 based CEX card, or as a cloud HSM, e.g., in form of a Hyper Protect Crypto Services (HPCS), i.e., a cloud HSM based on an CEX HSM, supporting a PKCS #11 API.

PKCS #11 (EP11) enablement, like in case of Linux on Z Enterprise, may allow applications to use a PKCS #11 API to run secure key cryptographic operations on an IBM® Crypto Express adapter that is configured as a Crypto Express EP11 coprocessor, shortly referred to as CEX*P, which stands for any type of a Crypto Express EP11 coprocessor. An IBM® Crypto Express adapter, which is configured with the Enterprise PKCS #11 (EP11) firmware, is called a Crypto Express EP11 coprocessor. A CEX4S adapter card is the first Crypto Express adapter which may be configured as an EP11 coprocessor. For example, a CEX5P, CEX6P, CEX7P or CEX8P on an appropriate IBM Z® system may be used as an EP11 coprocessor.

An application's request may first be submitted to a PKCS #11 API, e.g., implemented by the openCryptoki library and an EP11 token. From this token, the request may be propagated to the Crypto Express EP11 coprocessor. The request may then be processed on this coprocessor. The resulting output may finally be returned to the application across the involved interfaces. The EP11 cryptography architecture may offer a secure key infrastructure.

PKCS #11 refers to the Public-Key Cryptography Standards (PKCS) comprising a group of cryptographic standards that provide guidelines and application programming interfaces (APIs) for the usage of cryptographic methods. As the name PKCS suggests, these standards put an emphasis on the usage of public key (that is, asymmetric) cryptography. openCryptoki is an open-source implementation of the Cryptoki API defined by the PKCS #11 Cryptographic Token Interface Standard.

Key material may, e.g., be generated on the HSM, returned in an HSM key, e.g., HSM domain master-key, protected so-called key blob to the client workload and passed back by the client workload during subsequent requests to the HSM for usage by the HSM on the behalf of the client workload. The client workload manages and stores the key blob providing in cryptographically secured form the crypto material generated by the HSM for the client workload. The key material, protected by the HSM key, e.g., HSM domain master key, may be used only on this particular HSM, e.g., HSM domain, to which the HSM key, e.g., HSM domain master key, is assigned. The HSM, may, e.g., uses additional access control mechanisms, like Transport Layer Security (TLS) or Identify and Access Management (IAM) in case of a HPCS cloud HSM.

The client workload may, e.g., request the attestation document from the first attestation service, which may, e.g., be a local attestation service. The local attestation service may, e.g., be a component of an execution environment, within which the client workload is executed.

Upon the request by the client workload, the first attestation service may, e.g., create the attestation document of the client workload. The first attestation service may check certain features related to the client workload and attest the results of the checks by signing the attestation document generated for the client workload using a first cryptographic attestation signing key. The HSM may, e.g., use a first cryptographic attestation signature verification key for verifying the signature and thus the attested features relating to the client workload provided by the attestation document.

FIG. 1 is a block diagram for an exemplary system 101 comprising a remote stateless HSM 100, which provides cryptographic services and/or cryptographic operations for one or more client workloads 110, 130. In order to be enabled to use the cryptographic services and/or cryptographic operation is a secured way, the client workload 110 may request a cryptographic key form the stateless HSM 100. The HSM 100 may check an attestation document provided by an attestation service 120 for the client workload 110. Thereby, the HSM 100 may check, whether the client workload 110 is entitled to request a cryptographic key. The attestation document may be provided to the HSM 100 either via client workload 110 or alternatively directly. In case the client workload 110 is entitled to request a cryptographic key, the HSM 100 may generate the requested cryptographic key and assign attributes to the generated cryptographic key defining workload requirements to be satisfied by a client workload requesting a usage of the cryptographic key by HSM 100 on behalf of the requesting client workload 110. The attestation document may be verified using a workload assigning policy provided by HSM 100. The attributes may, e.g., be determined using the attestation document of client workload 110. For example, features attested in relation to client workload 110 by the attestation document of the client workload 110 may be included in the attributes. The generated requested cryptographic key and assigned attributes may be returned to client workload 110 by HSM 100 in cryptographically secured form. The key blob may, e.g., be encrypted by HSM 100 using a HSM key, such that only HSM 100 is enabled to decrypt and use the cryptographic key provided by the key blob for client workload 110. Client workload 110 may receive and store the key blob.

In case, the client workload 110 requires a cryptographic operation to be executed using the cryptographic key comprised by the key blob, the client workload 110 may sent a cryptographic operation request with the key blob to HSM 100. Furthermore, an attestation document of client workload 110 may be provided by attestation service 120. HSM 100 may, e.g., decrypt the key blob and verify using the attestation document as well as the attributes assigned to the cryptographic key, that client workload 110 is authorized to request a usage of the cryptographic key by HSM 100. In case the client workload 110 is authorized, HSM 100 may execute the requested cryptographic operation for client workload 110 using the cryptographic key of client workload 110 provided by the key blob. After the execution of the cryptographic operation HSM 100 may delete the key blob.

Thus, HSM 100 may, e.g., be configured for generating upon request a cryptographic key for the client workload 110 and using the cryptographic key for client workload 110 for providing cryptographic operations for client workload 110. Furthermore, HSM 100 may, e.g., be configured for providing an updating cryptographic key, i.e., a second cryptographic key for the updated client workload 130. The second cryptographic key for the updated client workload may, e.g., be provided upon request by the client workload 110, the updated client workload 130, or third party on behalf of the client workload, e.g., a secure build server 150. Updated client workload 130 may, e.g., be executed in the same execution environment. Attestation service 140 providing attestation documents for the updated client workload 130 may, e.g., be identical with attestation service 120 providing attestation documents for client workload 110 or may be different from attestation service 120.

Secure build server 150 may, e.g., be configured to build and provide the updated client workload 130. For example, secure build server 150 may be configured to request the second cryptographic key for the updated client workload 130. An authorization of the secure build server 150 for the requesting the second cryptographic key for the updated client workload 130 may be proven using an attestation document provided by attestation service 160 for secure build server 150. The resulting updated key blob comprising the second cryptographic key for the updated client workload 130 may, e.g., be forwarded by the requesting secure build server 150 to the updated client workload 130 for usage.

Figure 2:
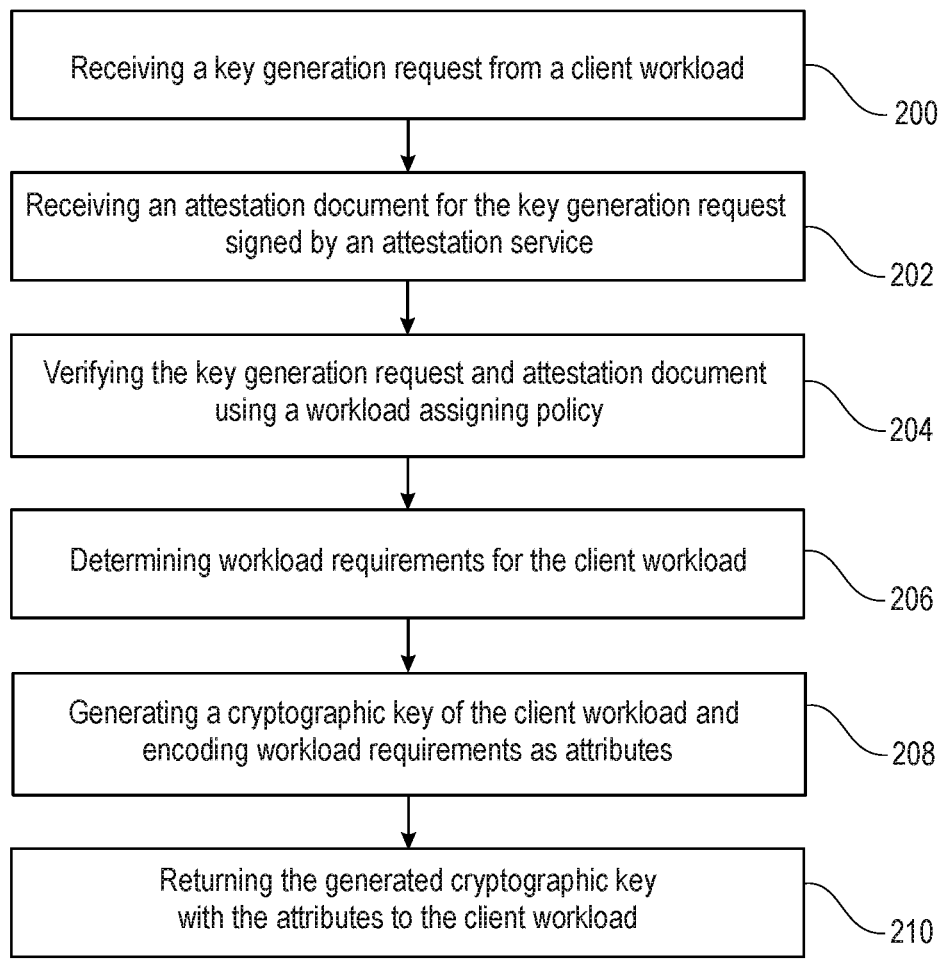
FIG. 2 is a flowchart of a method for in accordance with an example of the present subject matter.

FIG. 2 is a flowchart of an exemplary method for enabling a securing of cryptographic operations executed by a stateless HSM for a client workload. In block 200, the HSM receives a key generation request from the client workload. In block 202, the HSM receives an attestation document for the key generation request signed by a first attestation service using a first cryptographic attestation signing key. The attestation document may, e.g., be received from the client workload or from the attestation service directly. In block 204, the HSM verifies the key generation request and attestation document using a set of one or more pre-defined requirements of a workload assigning policy. The verification may comprise verifying the integrity and validity of the attestation document. In case the attestation document satisfies the requirements defined by the workload assigning policy for a key generation request, the verification may be successful.

The workload assigning policy may, e.g., be defined by an administrator. The workload assigning policy may, e.g., comprise requirements regarding trusted cryptographic attestation signing keys. For example, the workload assigning policy may comprise a set of trusted certificates with cryptographic attestation signature verification keys, that may be used to verify signatures generated using the cryptographic attestation signing keys. Furthermore, the workload assigning policy may, e.g., comprise check sums, like hashes, of multiple features relating to the client workloads authorized to use the HSM.

The workload assigning policy may, e.g., comprise an allowlist of attestation signing keys trusted by the HSM or an allowlist of certificates for attestation signing keys trusted by the HSM and requirements on a content provided by attestation documents.

In block 206, the HSM, upon successful verification of the key generation request and the attestation document for the key generation request, determines a set of one or more workload requirements for the client workload. The determining may, e.g., comprise extracting the features attested by the attestation document for the client workload and use these features as workload requirements.

Upon an unsuccessful verification, the key generation request may, e.g., be rejected by the HSM. For example, the HSM may temporarily reject the key generation request, if the attestation document cannot be verified or if the workload assigning policy requires additional requirements, no provided by the attestation document provided. Such an additional requirement may, e.g., be a nonce, in case a nonce-protected form of the attestation document is required by the workload assigning policy. Alternatively, the HSM may, e.g., invoke a remote attestation API that is associated with the client workload, e.g., provided by the execution environment, in which the client workload is executed. Via the remote attestation API, the first attestation service trusted by the HSM may, e.g., be contacted by the HSM, in order to obtain an attestation of the additionally additional requirements directly form the first attestation service. In case the HSM temporarily rejected the request, the first attestation service may, e.g., re-generate the attestation document for the client workload, e.g., upon a request by the client workload. The re-generated attestation document of the client workload may, e.g., including the additionally required information. This re-generated attestation document may be used for re-issue the key generation request by the client workload. For example, the HSM may accept the re-issued key generation request using the re-generated attestation document.

The attributes of the first cryptographic key define workload requirements workload requirements to be satisfied by an attestation document of the client workload, in order to enable the client workload to use the first cryptographic key. The attributes define, which client workload is authorized to use the generated first cryptographic key. In case of a use request for a usage of the first cryptographic key by the HSM on behalf of the client workload, the requesting client workload may, e.g., be identified and verified as the authorized client workload using an attestation document for the client workload, which is verified against the workload requirements defined by the attributes.

For determining the one or more workload requirements for the client workload the HSM may, e.g., use the attestation document and/or the workload assigning policy. For example, the workload assigning policy may define to use the features attested in relation with the client workload by the attestation document of the client workload as workload requirements for the client workload. Thus, it may be ensured the cryptographic key to be generated by the HSM for the client can be used only by the client workload, which requested the generation of the cryptographic key. For example, the attestation document of the client workload, that issued the key generation request, may be included into the workload requirements. Furthermore, an ID of the first cryptographic attestation signing key, the first cryptographic attestation signing key and/or a certificate with a cryptographic attestation signature verification key, that may be used to verify the signature generated using the cryptographic attestation signing key.

In block 208, the HSM generates a first cryptographic key of the client workload to be used by the HSM for providing cryptographic operations for the client workload and encoding the one or more workload requirements as one or more attributes of the generated first cryptographic key of the client workload for assigning a usability of the generated first cryptographic key to cryptographic operation requests by the client workload.

In block 210, the HSM returns the generated first cryptographic key of the client workload with the one or more attributes of the generated first cryptographic key to the client workload. The generated first cryptographic key of the client workload with the one or more attributes of the generated first cryptographic key is cryptographically secured using a HSM key. The first cryptographic key with the attributes may, e.g., be provided in form of a key blob encrypted by the HSM using the HSM key.

In an example, the first cryptographic key generated for the client workload with the one or more attributes of the generated first cryptographic key is cryptographically secured by encryption using the HSM key. Thus, only the HSM may be enabled to use the first cryptographic key after a decryption of the encryption with the HSM key.

In an example, the one or more workload requirements for the client workload is determined using one or more of the following: the attestation document for the key generation request, the workload assigning policy. For example, the workload assigning policy may define to use the attestation document for determining the workload requirements. Furthermore, the workload assigning policy may provide further workload requirements in addition to the workload requirements provided by the attestation document for the key generation request.

In an example, the attestation document for the key generation request is received from the client workload together with the key generation request. In an example, the attestation document for the key generation request is received from the first attestation service in addition to the key generation request.

In an example, the attestation document for the key generation request being generated using a nonce. Using a nonce may, e.g., enable the HSM to ensure that the attestation document for the key generation request is used only once and not again later on to request a generation of another cryptographic key. In order to successfully request a generation of another cryptographic key, another attestation document comprising another nonce would have to be generated. For example, the nonce to be incorporated into the attestation document may be defined and provided by the HSM.

In an example, the attestation document for the key generation request comprises one or more of the following: a machine type ID of a machine, on which the client workload is executed: a check sum of a base image of an execution environment of the client workload: a check sum of a root partition at a moment of a first boot of the execution environment of the client workload, the root partition being used for the first boot: a check sum of a root partition at a build time of the execution environment of the client workload, the root partition being used for building the execution environment: a check sum of a client workload container image comprising the client workload: a geolocation of the machine, on which the client workload is executed: an ID of a cryptographic attestation signature verification key for verifying the signature generated using the first cryptographic attestation signing key; a certificate for verifying the signature generated using the first cryptographic attestation signing key.

In an example, the workload assigning policy comprising one or more of the following: the ID of the cryptographic attestation signature verification key for verifying the signature generated using the first cryptographic attestation signing key; certificate for verifying the signature generated using the first cryptographic attestation signing key; the cryptographic attestation signature verification key for verifying the signature generated using the first cryptographic attestation signing key; the machine type ID of the machine, on which the client workload is executed: the check sum of the base image of the execution environment of the client workload: the check sum of the root partition at the moment of first boot of the execution environment of the client workload, the root partition being used for the first boot: the check sum of the root partition at the build time of the execution environment of the client workload, the root partition being used for the building of the execution environment: the client workload container image comprising the client workload: the geolocation of the machine, on which the client workload is executed: one or more predefined constraints for using the first cryptographic key generated for the client workload: one or more rules for updating the first cryptographic key generated for the client workload.

In an example, the attestation requirements defined by the workload assigning policy are defined based on one or more of the following: the client, a tenant, a key type of the first cryptographic key, the client workload, the geolocation of the machine, on which the client workload is executed. A tenant refers to a party that interacts with the client. The client can, e.g., send requests on behalf of the tenant, e.g., including a tenant ID.

In an example, the workload assigning policy comprises one or more selection rules for selecting attestation requirements to be satisfied based on one or more of the following: a client type, a tenant type, a key type of the first cryptographic key, a client workload type, the geolocation of the machine, on which the client workload is executed.

In an example, the one or more predefined constraints for using the first cryptographic key generated for the client workload comprise one or more of the following: a predefined maximum number of allowed usages of the first cryptographic key for executing cryptographic operations: an expiry date of the first cryptographic key; list of allowed of networks for receiving requests comprising the first cryptographic key by the HSM; a list of allowed originators for update requests comprising the first cryptographic key.

In an example, the one or more rules for updating the first cryptographic key generated for the client workload comprise one or more of the following: constraints for an updated workload, that will use the cryptographic key; type of policy, containing list of values that are allowed to be changed; shared secret credential, shared between workloads that use the cryptographic key; build server, which will build the workloads that use the cryptographic key; constraints about using the cryptographic key, which limits the usage of the cryptographic key based upon one or more of the client, tenant, key type, workload, geolocation of the workload, number of cryptographic operations, expiry date of the cryptographic key, list of allowed networks to send requests to the HSMs.

In an example, the one or more attributes of the generated first cryptographic key of the client workload comprising one or more of the following: the ID of the cryptographic attestation signature verification key for verifying the signature generated using the first cryptographic attestation signing key; the cryptographic attestation signature verification key for verifying the signature generated using the first cryptographic attestation signing key; the machine type ID of the machine, on which the client workload is executed: the check sum of the base image of the execution environment of the client workload: the check sum of the root partition at the moment of first boot of the execution environment of the client workload, the root partition being used for the first boot: the check sum of the root partition at the build time of the execution environment of the client workload, the root partition being used for the building of the execution environment: the client workload container image comprising the client workload: the geolocation of the machine, on which the client workload is executed: an ID of the generated first cryptographic key of the client workload.

In an example, the first attestation service being a component of the execution environment of the client workload.

Figure 3:
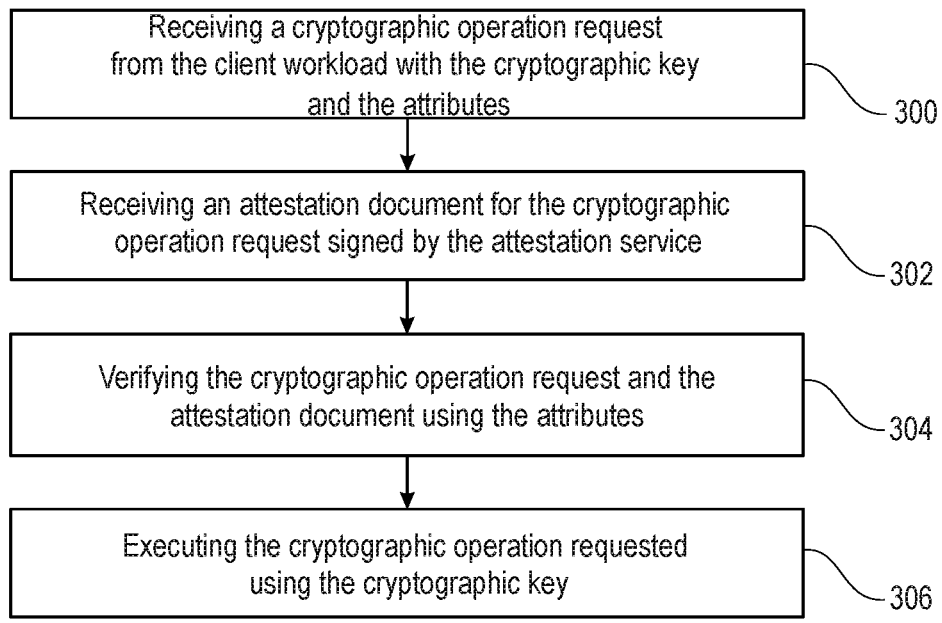
FIG. 3 is a flowchart of a method for in accordance with an example of the present subject matter.

FIG. 3 is a flowchart of an exemplary method for using the first cryptographic key for a cryptographic operation to be executed by the HSM for the client workload. In block 300, the HSM receives a cryptographic operation request from the client workload. The cryptographic operation request is received together with the first cryptographic key of the client workload and the one or more attributes of the first cryptographic key, which are cryptographically secured using the HSM key. The requested cryptographic operation may, e.g., comprise an encrypting, decrypting and/or signing using the first cryptographic key of the client workload.

In block 302, the HSM receives an attestation document for the cryptographic operation request signed by the first attestation service using the first cryptographic attestation signing key. The client workload may request a cryptographic operation to be executed by the HSM, e.g., by passing a key blob comprising the first cryptographic key and the attributes assigned to the first cryptographic key optionally together with the attestation document to the HSM as part of the cryptographic operation request. In case the client workload does not provide an attestation document together with cryptographic operation request or an insufficient attestation document, the HSM may, e.g., temporarily reject the cryptographic operation request and request an attestation document from the client workload. The requested attestation document may, e.g., be requested to comprise a nonce. Alternatively, the HSM may, e.g., invoke a remote attestation protocol in order to receive a suitable attestation document of the client workload requesting the cryptographic operation.

In block 304, the HSM verifies the cryptographic operation request and the attestation document for the cryptographic operation request using the one or more attributes of the first cryptographic key of the client workload. In case the attestation document received for the cryptographic operation request satisfy the workload requirements defined by the attributes of the first cryptographic key, cryptographic operation request and the attestation document may be verified.

In block 306, the HSM, upon successful verification of the cryptographic operation request and the attestation document for the cryptographic operation request, executes the cryptographic operation requested by the cryptographic operation request using the first cryptographic key of the client workload. After the execution of the requested cryptographic operation, the received first cryptographic key of the client workload as well as the attributes may deleted on the stateless HSM. Upon an unsuccessful verification, the cryptographic operation request may, e.g., be rejected by the HSM. For example, the cryptographic operation request may be rejected using an error code. If the cryptographic operation request is rejected temporarily, the client workload may repeat the cryptographic operation request by retrieving, e.g., from the local first attestation service, additional attestation records and providing the same to the HSM.

In an example, the received first cryptographic key of the client workload with the one or more attributes of the first cryptographic key cryptographically secured by encryption using the HSM key is decrypted by the HSM for usage by the HSM. Thus, only the HSM may be enabled to use the first cryptographic key after a decryption of the encryption with the HSM key.

In an example, the attestation document for the cryptographic operation request is received from the client workload together with the cryptographic operation request. In an example, the attestation document for the cryptographic operation request is received from the first attestation service in addition to the cryptographic operation request.

In an example, the attestation document for the cryptographic operation request is generated using a nonce. Using a nonce may, e.g., enable the HSM to ensure that the attestation document for the cryptographic operation request is used only once and not again later on to request an execution of another cryptographic operation. In order to successfully request an execution of another cryptographic operation, another attestation document comprising another nonce would have to be generated. For example, the nonce to be incorporated into the attestation document may be defined and provided by the HSM.

Figure 4:
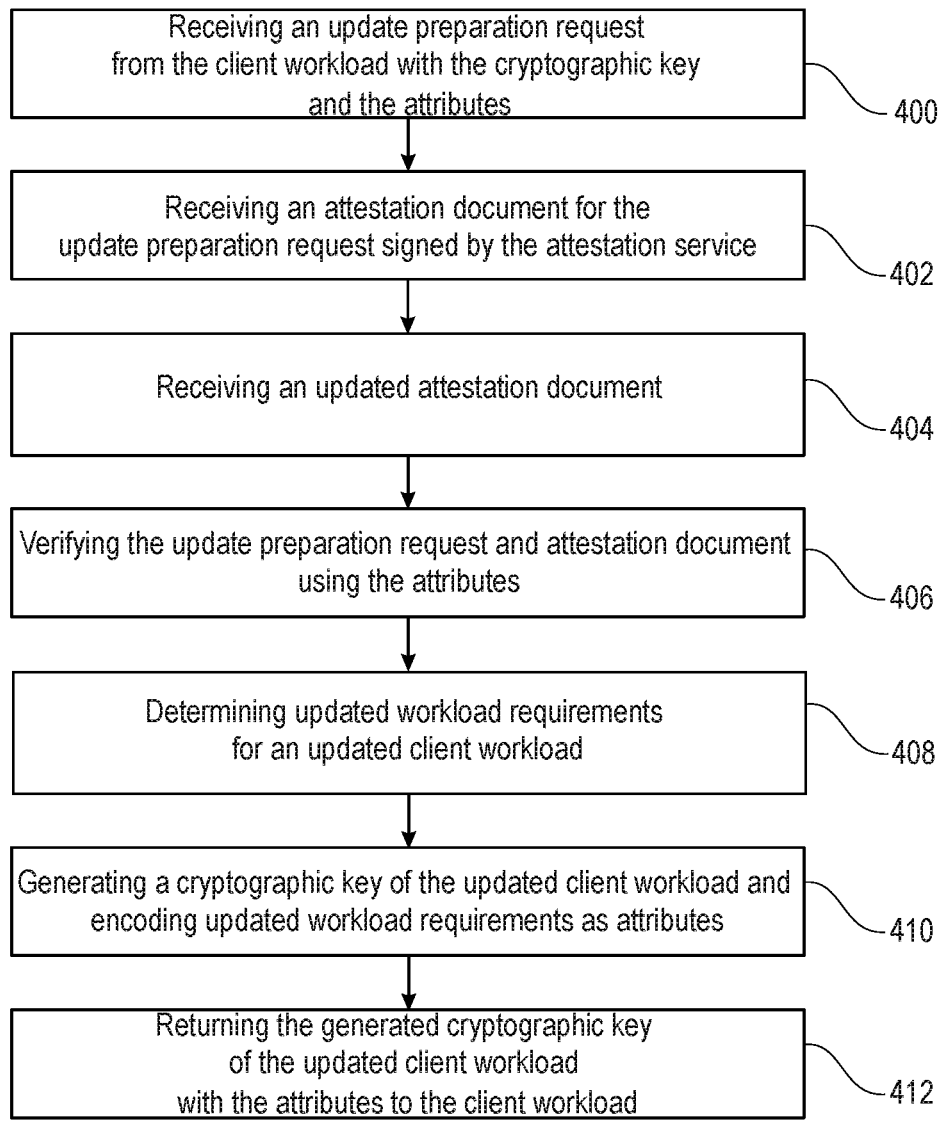
FIG. 4 is a flowchart of a method for in accordance with an example of the present subject matter.

FIG. 4 is a flowchart of an exemplary method for preparing an update of client workload. In block 400, the HSM receives an update preparation request from the client workload. The update preparation request is received together with the first cryptographic key of the client workload and the one or more attributes of the first cryptographic key, which are cryptographically secured using the HSM key. In block 402, the HSM receives an attestation document for the update preparation request signed by the first attestation service using the first cryptographic attestation signing key. In block 404, the HSM receives an updated attestation document. The updated attestation document may, e.g., comprise values of workload requirements to be satisfied by an updated client workload.

In block 406, the HSM verifies by the HSM the update preparation request and the attestation document for the update preparation request using the one or more attributes of the first cryptographic key of the client workload. In block 408, the HSM determines a set of one or more updated workload requirements for an updated client workload using the updated attestation document. For example, values of workload requirements to be satisfied by an updated client workload as defined by the updated attestation document may be used for the updated client workload.

In block 410, the HSM, upon successful verification of the update preparation request and the attestation document for the update preparation request, generates a second cryptographic key of the updated client workload and encodes the one or more updated workload requirements as one or more attributes of the generated second cryptographic key of the updated client workload for assigning a usability of the generated second cryptographic key to cryptographic operation requests by the updated client workload. Upon an unsuccessful verification, the update preparation request may, e.g., be rejected by the HSM.

The attributes of the second cryptographic key define updated workload requirements, i.e., workload requirements to be satisfied by an attestation document of the updated client workload, in order to enable the updated client workload to use the second cryptographic key.

In block 412, the HSM returns the generated second cryptographic key of the updated client workload with the one or more attributes of the generated second cryptographic key to the client workload to be passed on to the updated client workload. The generated second cryptographic key of the client workload with the one or more updated attributes of the generated second cryptographic key is cryptographically secured using the HSM key.

Alternatively, in block 410, the HSM, upon successful verification of the update preparation request and the attestation document for the update preparation request, may complement the one or more attributes of the first cryptographic key of the client workload with one or more additional attributes encoding the one or more updated workload requirements. Thus, usability of the first cryptographic key may in addition be assigned to cryptographic operation requests by the updated client workload. Thus, the client workload as well as the updated client workload may be enabled to use the first cryptographic key. In this case, the HSM returns in block 412 the first cryptographic key with the one or more attributes of the first cryptographic key as well as the one or more updated attributes of the first cryptographic key to the client workload to be passed on to the updated client workload. The first cryptographic key of the client workload with the one or more attributes as well as the one or more updated attributes is cryptographically secured using the HSM key.

In an example, the received first cryptographic key of the client workload with the one or more attributes of the first cryptographic key cryptographically secured by encryption using the HSM key is decrypted by the HSM for usage by the HSM. Thus, only the HSM may be enabled to use the first cryptographic key after a decryption of the encryption with the HSM key.

In an example, the updated attestation document is an attestation document for an implemented updated client workload signed by a second attestation service using a second cryptographic attestation signing key. The second attestation service may, e.g., be identify with the first attestation service. Alternatively, the second attestation service may, e.g., be different from the first attestation service.

In an example, the updated attestation document is received from the client workload together with the update preparation request. In an example, the updated attestation document is received from the second attestation service in addition to update preparation request.

In an example the updated attestation document is a prediction of an attestation document for a prediction of the updated client workload. In an example, the updated attestation document request is generated using a nonce.

In an example, the attestation document for the update preparation request is received from the client workload together with the update preparation request. In an example, the attestation document for the update preparation request is received from the first attestation service in addition to the update preparation request.

In an example, the attestation document for the update preparation request is generated using a nonce. Using a nonce may, e.g., enable the HSM to ensure that the attestation document for the update preparation request is used only once and not again later on to request another update preparation. In order to successfully request another update preparation, another attestation document comprising another nonce would have to be generated. For example, the nonce to be incorporated into the attestation document may be defined and provided by the HSM.

In an example, the update preparation request from the client workload comprises a shared secret. The shared secret is a secret to be passed on to the updated client workload by the client workload. The shared secret is encoded by the HSM as an attribute of the one or more attributes of the generated second cryptographic key of the updated client workload.

In an example, the generated second cryptographic key of the updated client workload with the one or more attributes of the generated second cryptographic key is cryptographically secured using the HSM key independently of the first cryptographic key of the client workload with the one or more attributes of the first cryptographic key of the client workload.

In an example, the generated second cryptographic key of the updated client workload with the one or more attributes of the generated second cryptographic key is cryptographically secured in combination with the first cryptographic key of the client workload with the one or more attributes of the first cryptographic key of the client workload. The combination is configured to be used by the client workload as well as the updated client workload.

Figure 5:
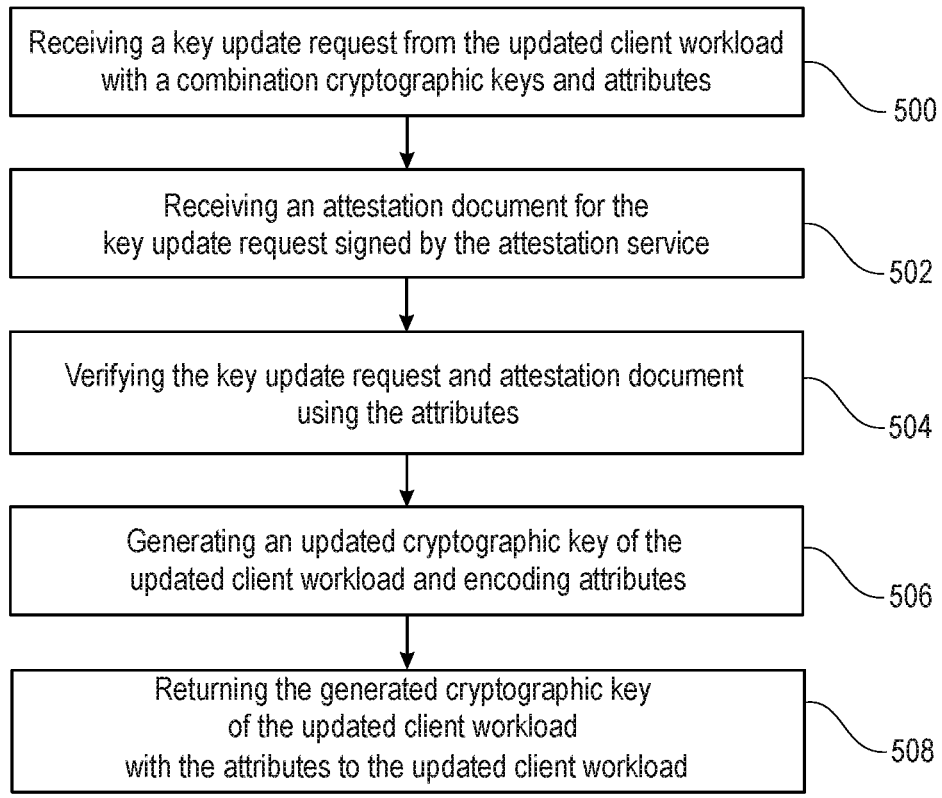
FIG. 5 is a flowchart of a method for in accordance with an example of the present subject matter.

FIG. 5 is a flowchart of an exemplary method for requesting an updated cryptographic key for the updated client workload. In block 500, the HSM receives a key update request from the updated client workload. The key update request is received together with the combination of the first cryptographic key of the client workload with the one or more attributes of the first cryptographic key of the client workload and the second cryptographic key of the updated client workload with the one or more attributes of the second cryptographic key of the updated client workload. The combination is cryptographically secured using the HSM key. Thus, in a client workload update and key transfer use case, e.g., the first cryptographic key scoped to the client workload and the second cryptographic key generated during a previous iteration of this method and scoped to the updated client workload.

In block 502, the HSM receives an attestation document for the key update request signed by the second attestation service using the second cryptographic attestation signing key. In block 504, the HSM verifies the key update request and the attestation document for the key update preparation request using the one or more attributes of the second cryptographic key of the updated client workload. In block 506, the HSM, upon successful verification of the key update request and the attestation document for the key update request, generates a third cryptographic key of the updated client workload and encodes the one or more attributes of the second cryptographic key as one or more attributes of the generated third cryptographic key of the updated client workload for assigning a usability of the generated third cryptographic key to cryptographic operation requests by the updated client workload. Upon an unsuccessful verification, the key update request may, e.g., be rejected by the HSM.

In block 508, the HSM returns the generated third cryptographic key of the updated client workload with the one or more attributes of the generated third cryptographic key to the updated client workload as a replacement for the combination of the first cryptographic key of the client workload with the one or more attributes of the first cryptographic key of the client workload and the second cryptographic key of the updated client workload with the one or more attributes of the second cryptographic key of the updated client workload. The generated third cryptographic key of the client workload with the one or more attributes of the third cryptographic key is cryptographically secured using the HSM key.

In an example, the received combination of the first cryptographic key of the client workload with the one or more attributes of the first cryptographic key of the client workload and the second cryptographic key of the updated client workload with the one or more attributes of the second cryptographic key of the updated client workload cryptographically secured by encryption using the HSM key is decrypted by the HSM. Thus, only the HSM may be enabled to use the cryptographic keys after a decryption of the encryption with the HSM key.

In an example, the third cryptographic key generated for the updated client workload with the one or more attributes of the generated third cryptographic key is cryptographically secured by encryption using the HSM key. Thus, only the HSM may be enabled to use the third cryptographic key after a decryption of the encryption with the HSM key.

In an example, the attestation document for the key update request is received from the client workload together with the key update request. In an example, the attestation document for the key update request is received from the first attestation service in addition to the key update request.

In an example, the attestation document for the key update request is generated using a nonce. Using a nonce may, e.g., enable the HSM to ensure that the attestation document for the key update request is used only once and not again later on to request a generation of another updated cryptographic key. In order to successfully request a generation of another updated cryptographic key, another attestation document comprising another nonce would have to be generated. For example, the nonce to be incorporated into the attestation document may be defined and provided by the HSM.

Figure 6:
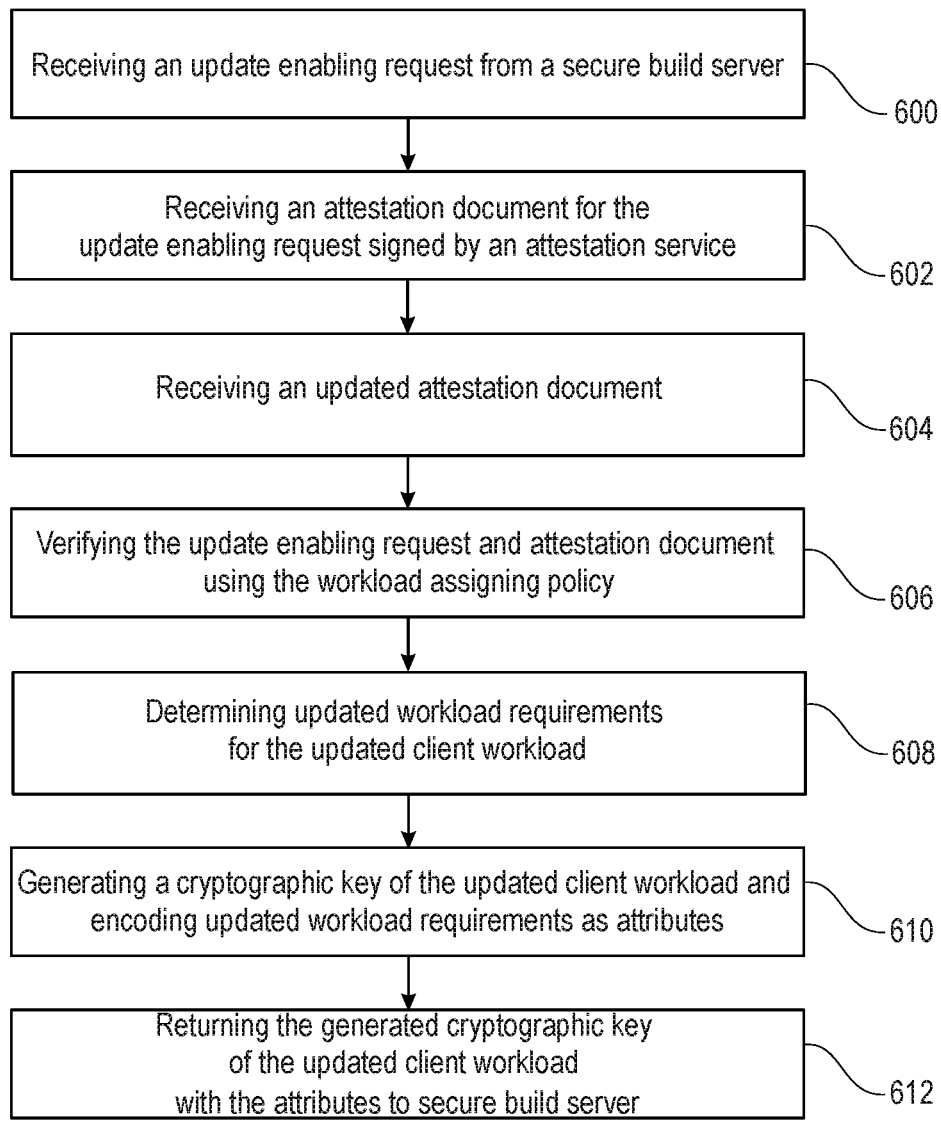
FIG. 6 is a flowchart of a method for in accordance with an example of the present subject matter.

FIG. 6 is a flowchart of an exemplary method for requesting a cryptographic key for an updated client workload by a secure build server. In block 600, the HSM receives an update enabling request from a secure build server. In block 602, the HSM receives an attestation document for the enabling request signed by a third attestation service using a third cryptographic attestation signing key. In block 604, the HSM receives an updated attestation document. In block 606, the HSM verifies the update enabling request and the attestation document for the update enabling request using the set of one or more pre-defined requirements of the workload assigning policy.

In block 608, the HSM determines a set of one or more updated workload requirements for the updated client workload using the updated attestation document. In block 610, the HSM, upon successful verification of the update enabling request and the attestation document for the update enabling request, generates the second cryptographic key of the updated client workload and encodes the one or more updated workload requirements as one or more attributes of the generated second cryptographic key of the updated client workload for assigning a usability of the generated second cryptographic key to cryptographic operation requests by the updated client workload. Upon an unsuccessful verification, the update enabling request may, e.g., be rejected by the HSM.

In block 612, the HSM returns the generated second cryptographic key of the updated client workload with the one or more attributes of the generated second cryptographic key to the secure build server to be passed on to the updated client workload. The generated second cryptographic key of the client workload with the one or more updated attributes of the generated second cryptographic key is cryptographically secured using the HSM key.

Figure 7:
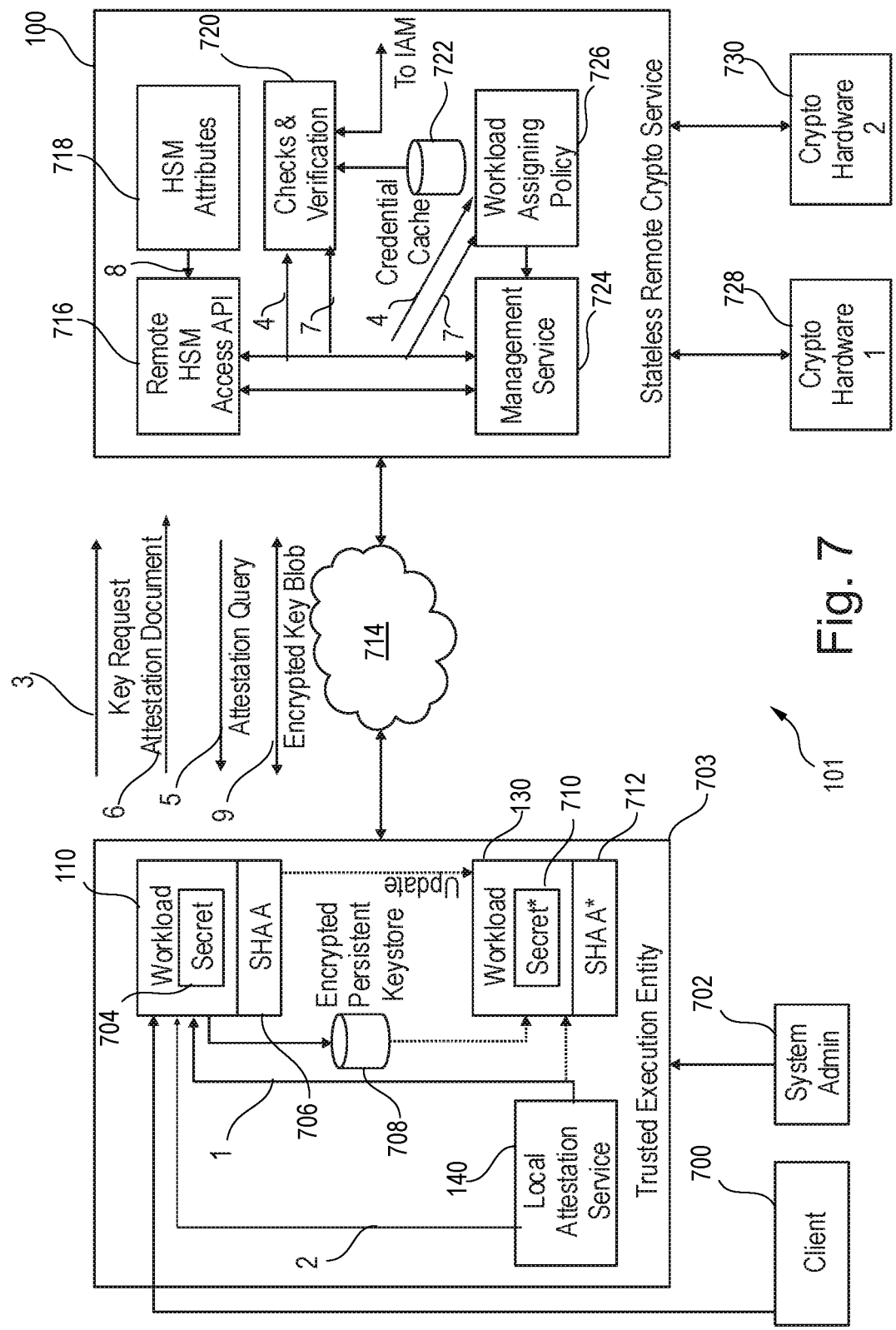
FIG. 7 is a block diagram of a system comprising a stateless hardware security module in accordance with an example of the present subject matter.

FIG. 7 is a block diagram for an exemplary system 101 comprising a remote stateless HSM 100 providing a stateless remote crypto service for a client workload 110. Client workload 110 may communicate with the remote stateless HSM 100 via network 714. Furthermore, client workload 110, which is provided by client 700 and executed by a trusted execution entity 703 providing an execution environment for the client workload 110, may, e.g., be identifiable by hash 706 "SHA A". The trusted execution entity 703 may, e.g., be controlled by a system administrator 702. In step 1, a local attestation service 140, e.g., comprised by the trusted execution entity 703 may check client workload 110 and generate in step 2 an attestation document for client workload 110. The attestation document may, e.g., comprise the following:

```
{"machine": x390x,
    "hostname": webportal.com,
    "geo_location": EU-South,
    "boadloader_csum": 549a2e...,
    "image_csum": 39dfa103...,
    "software_csum": 892df1d...,
    "hypervisor_csum": 64e1d2..., ...}
```

In step 3, the client workload 110 may, e.g., request a cryptographic key from the HSM 100. In step 4, HSM may check and verify the request using component 720. Furthermore, HSM 100 may use the workload assigning policy 726 for the checking. In case the attestation document has not been provided to HSM 100 yet, HSM 100 may send an attestation in step 5 and receive in reply to the attestation query the attestation document in step 6. In step 7, the received attestation document may be verified by HSM 100 as well using component 720 and workload assigning policy 726. The workload assigning policy 726 may define workload requirement s to be satisfied by the attestation document of client workload 110, like, e.g.,

```
{"attest1": "image_csum",
    "attest2": "machine_csum",
    "attest3": "geo-location", ...}.
```

For the verifying, component 720 may, e.g., use credentials provided by credential cache 722. A management service component 724 may manage the stateless remote crypto service provided by HSM 100 and define features of the same, like

```
{"hostname": cryptservice.com,
    "allow_net": 10.1.0.0/24, ...}.
```

A remote HSM access API may be used in step 8 together with HSM attributes provided by component 718 to generate the requested cryptographic key for the client workload 110 assigned with attributes, using one or more of the crypto hardware components 728, 730. The HSM attributes may, e.g., comprise:

```
{"hsm_category": cex8s,
    "max_ops_per_sec": 5000,
    "max_tenants": 24, ...}.
```

In step 9, an encrypted key blob comprising the generated cryptographic key as well as the attributes assigned to the generated cryptographic key. This key blob may be used by the client workload 110 to request cryptographic operations to be executed by HSM 100 upon request by the client workload 110. An exemplary key blob, encrypted by HSM 100, may, e.g., comprise:

```
{"key_id": 12345,
    "key_material": ac91392db54c...,
    "key_attributes": {
        "expiry_time": 31_12_2022,
        "total_operations": 1000000, ...},
    "attestation_document": {
        "machine_type": s390x,
        "secret": secretorpubkey,
        "image_csum": 39dfa103...,
        "software_csum": 892df1d..., ...},
    "hsm_record": {
        "hsm_category": cex8s, ...}}.
```

In addition, the client workload 110 may be updated resulting in an updated client workload 130. The updated client workload 130 may, e.g., be executed by the trusted execution entity 703 as well and be identifiable by hash 712 "SHA A*" different from hash 712 "SHA A" of client workload 110. For the updated client workload 130, client workload 110 may, e.g., request an updated cryptographic key with updated attributes. The resulting updated key blob may be provided to the updated client workload 130 via an encrypted persistent keystore 706 of trusted execution entity 703. Thus, the updated client workload 130 may be enabled to use the stateless remote crypto service provided by HSM 100 as well. For example, client workload 110 and updated client workload 130 may share a common secret 704, 710. The common secret 704 may, e.g., be passed on from client workload 110 to updated client workload 130 via encrypted persistent keystore 706. The local attestation service 140 may be configured to generate attestation documents for the updated client workload 130 as well.

Using the workload attestation policy, the HSM may, e.g., maintain a hierarchy of a stratified set of client workload requirements containing requirements on attestation records related to characteristics of client workloads. The requirements may contain, e.g., expected attestation record values, conditions on attestation signing keys, and/or pointers to other requirements and/or pointers to expected values stored inside a key blob of a cryptographic scoped key. The requirements may, e.g., be stored in a workload attestation policy on the side of the HSM. Furthermore, requirements may, e.g., be stored in form of attributes in key blobs of cryptographic scoped keys returned to and stored by the client workloads for which the cryptographic scoped keys have been generated by the HSM.

The attestation service may, e.g., be a secure service enable on or from an execution environment, within which the client workload, for which features are to be attested by the attestation service, is executed. For example, the attestation service may be based on a Trusted Platform Module (TPM) or be implemented and provided by an ultravisor. An ultravisor is trusted firmware that uses memory-protection hardware to enforce memory protection. The attestation service may, e.g., implement the spirit of a TPM, i.e., the measurement of the client workload is executed a trusted component, i.e., trusted by the attestation service. An alternative technology to a TPM that could implement such an attestation service is a ultravisor for a secure guest, e.g., the attestation function added to secure execution for z16.

The workload assigning policy may, e.g., be established by an administrator of the HSM. For example, the workload assigning policy may be stored by a management server component. The HSM and a management server compromising the management server component may, e.g., establish trust. An exemplary workload assigning policy may, e.g., be an implicit workload assigning policy. The implicit workload assigning policy may, e.g., be a default workload assigning policy. The attributes comprised by the key blob may, e.g., be defined to exactly match attestable characteristics of the client workload, for which the key blob was generated. Thus, the key blob can only be used by the client workload, for which the key blob was generated.

An exemplary workload assigning policy may, e.g., be an updatable workload assigning policy. The updatable workload assigning policy may enable an updating, i.e., modifying of attributes of a key blob. For example, a client workload, which is authorized to use the key blob, may request an update of the workload scoping requirement, e.g., by providing attestation records of an updated client workload, which should also be able to use the key blob. The HSM may then update the key blob attributes accordingly. The resulting key blob may then be used by the original client workload and the updated client workload.

An exemplary workload assigning policy may, e.g., be a protected updatable workload assigning policy. The protected updatable workload assigning policy may, e.g., enable an additional step for authenticating an updated client workload. For example, the original client workload and the updated client workload may have to share common secret or credential. The original client workload requests to add the common secret or credential to the key blob. The common secret or credential may be added to the key blob. The updated client workload may, e.g., request the HSM to update the workload requirements, i.e., attributes, in the key blob, while providing the expected common secret or credential as well as its current attestation document. The HSM may, e.g., update the attestation document, if the common secret or credential provided by the updated client workload matches common secret or credential previously added to the key blob. Alternatively or additionally, this may be combined with requirements on the attestation signing keys used for signing the attestation document of the original client workload and the updated client workload, e.g., having the same attestation signing keys, a common root certifying authority (CA) and/or intermediate CA.

An exemplary workload assigning policy may, e.g., be a secure build workload assigning policy. The secure build workload assigning policy may enable a secure build server to be trusted to provide statements about scoping compatibility between different versions of a client workload, e.g., a container sha1 may be compatible with a container sha2, or between attestation documents. The secure build workload assigning policy may, e.g., define trusted client workloads, e.g., comprising reference attestation documents and/or attestation signing keys of the trusted workloads. This way, e.g., a hierarchy of trusted client workloads may be established.

In the following examples of attestation policies are provided, which may be used to govern the key-usage and/or key-update. It is possible to, e.g., mix and/or develop policies as well as update, redefine and/or insert parameters according to the needs of the system.

An exemplary implicit attestation policy may, e.g., comprise:

```
{"policy_id": f9231,
  "client_id": 856ef3,
  "policy_name": implicit,
  "create_policy_vector": {
    "key": {"key_id": 12345, "type": symmetric, ...},
    "machine": {"machine_type": s390x, "fixed": true},
    "workload": {"image_csum": 39dfa103..., "fixed": true},
    "software": {"software_csum": 892df1d..., "fixed": true},
    "boot": {"bootloader_csum": a31b03..., "fixed": true},
    "allow_list": {"geo_location": EU-South, "fixed": true}, ...}
  "use_policy_vector": {
    "machine" : &key.attestation.machine,
    "workload": &key.attestation.workload,
    "software": &key.software.workload, ...}}
```

An exemplary secure attestation policy may, e.g., comprise:

```
{"policy_id": 105ed8,
  "client_id": f1903b,
  "policy_name": secure,
  "policy_vector": {
    "key": {"key_id": 12345, "type": symmetric, ...},
    "machine": {"machine_type": s390x, "fixed": false},
    "workload": {"image_csum": 39dfa103..., "fixed": false},
    "software": {"software_csum": 892df1d..., "fixed": false},
    "boot": {"bootloader_csum": a31b03..., "fixed": false},
    "allow_list": {"geo_location": EU-South, "fixed": false}, ...},
  use_policy_vector: { ...},
  "update_allow_list": {
    "build_server": {
      "key": {"key_id": 12345, "type": symmetric, ...},
      "machine": {"machine_type": s390x, "fixed": false},
      "workload": {"image_csum": 39dfa103..., "fixed": false},
      "software": {"software_csum": 892df1d..., "fixed": false},
      "boot": {"bootloader_csum": a31b03..., "fixed": false}, ...}}}
```

An exemplary updateable attestation policy may, e.g., comprise:

```
{"policy_id": 31dac3,
  "client_id": ab3103,
  "policy_name": updateable,
  "policy_vector": {
    "key": {"key_id": 12345, "type": symmetric, ...},
    "machine": {"machine_type": s390x, "fixed": true},
    "workload": {"image_csum": 39dfa103..., "fixed": false},
    "software": {"software_csum": 892df1d..., "fixed": false},
```

```
    "boot": {"bootloader_csum": a31b03..., "fixed": true},
    "allow_list": {"geo_location": EU-South, "fixed": false}, ...},
use_policy_vector: { ...},
"update_policy_vector": {
    "machine" : &key.attestation.machine,
    "workload": {"image_csum": 49dfa103..., "fixed": false},
    "software": &key.software.workload, ...}}
```

An exemplary protected updateable attestation policy may, e.g., comprise:

```
{"policy_id": 932b1c,
    "client_id": ab923e,
    "policy_name": protected,
    "policy_vector": {
        "key": {"key_id": 12345, "type": symmetric, ...},
        "machine": {"machine_type": s390x, "fixed": false},
        "workload": {"image_csum": 39dfa103..., "fixed": false},
        "software": {"software_csum": 892df1d..., "fixed": false},
        "boot": {"bootloader_csum": a31b03..., "fixed": false},
        "allow_list": {"geo_location": EU-South, "fixed": false}, ...},
use_policy_vector: { ...},
"protected_update_policy_vector": {
"key": {"key_id": 12345, "type": symmetric, ... },
    "machine": {"machine_type": s390x, "fixed": false},
    "workload": {"image_csum": 39dfa103..., "fixed": false},
    "software": {"software_csum": 892df1d..., "fixed": false},
    "boot": {"bootloader_csum": a31b03..., "fixed": false}, ...}}
```

An exemplary implicit attestation policy may, e.g., comprise:

```
{"policy_id": f9231,
    "client_id": 856ef3,
    "policy_name": implicit,
    "policy_vector": {
        "key": {"key_id": 12345, "type": symmetric, ...},
        "machine": {"machine_type": s390x, "fixed": true},
        "workload": {"image_csum": 39dfa103..., "fixed": true},
        "software": {"software_csum": 892df1d..., "fixed": true},
        "boot": {"bootloader_csum": a31b03..., "fixed": true},
        "allow_list": {"geo_location": EU-South, "fixed": true}, ...}}
```

An exemplary secure attestation policy may, e.g., comprise:

```
{"policy_id": 105ed8,
    "client_id": f1903b,
    "policy_name": secure,
    "policy_vector": {
        "key": {"key_id": 12345, "type": symmetric, ...},
        "machine": {"machine_type": s390x, "fixed": true},
        "workload": {"image_csum": 39dfa103..., "fixed": false},
        "software": {"software_csum": 892df1d..., "fixed": false},
        "boot": {"bootloader_csum": a31b03..., "fixed": false},
        "allow_list": {"geo_location": EU-South, "fixed": false}, ...}},
    "update_allow_list": {
        "build_server": {
            "build_server-0": {"secret": secretorfile, "machine_type": s390x, ...},
            "build_server-1": {"secret": secretorfile, "machine_type": x86, ...}, ...}} }
```

An exemplary updateable attestation policy may, e.g., comprise:

```
{"policy_id": 31dac3,
    "client_id": ab3103,
    "policy_name": updateable,
    "policy_vector": {
        "key": {"key_id": 12345, "type": symmetric, ...},
        "machine": {"machine_type": s390x, "fixed": true},
        "workload": {"image_csum": 39dfa103..., "fixed": false},
        "software": {"software_csum": 892df1d..., "fixed": false},
        "boot": {"bootloader_csum": a31b03..., "fixed": true},
        "allow_list": {"geo_location": EU-South, "fixed": false}, ...},
    "update_allow_list": {
        "host": {
            "host-0": {"secret": secretorfile, "machine_type": x86, ...},
            "host-1": {"secret": secretorfile, "machine_type": s390x, ...}, ...}}}
```

An exemplary protected updateable attestation policy may, e.g., comprise:

```
{"policy_id": 932b1c,
    "client_id": ab923e,
    "policy_name": protected,
    "policy_vector": {
        "key": {"key_id": 12345, "type": symmetric, ...},
        "machine": {"machine_type": s390x, "fixed": false},
        "workload": {"image_csum": 39dfa103..., "fixed": false},
        "software": {"software_csum": 892df1d..., "fixed": false},
        "boot": {"bootloader_csum": a31b03..., "fixed": false},
        "allow_list": {"geo_location": EU-South, "fixed": false}, ...},
    "update_allow_list": {
        "originator": {"secret": secretorfile, "machine_type": x390x, ...},
        "destination": {"secret": secretorfile, "machine_type": s390x, ...}, ...}}
```

The attestation-based workload-scoping of cryptographic keys as described herein may, e.g., enable a scoping of cryptographic keys to specific client workloads. For example, only an individual client workload, for which a cryptographic key has been generated, may be authorized to use this cryptographic key. Workload scoping may be enforced and verified by the HSM based on attestation using attestation documents of client workloads requesting cryptographic services and/or operations provided by the HSM for attested client workloads. A client workload scope and related information may, e.g., be implemented using requirements determined by the HSM during key generation on basis of a workload assigning policy and/or attention documents provided. These requirements are, e.g., stored inside a key blob. The key blob, may be stored independently of the HSM, e.g., by the client workload. Furthermore, novel mechanisms for controlled client workload scope updates may be implemented. A client workload may, e.g., request the HSM to transfer or extend a workload scope defined by a key blob to an updated workload. For example, a trusted third party, like a secure build server, may request a transfer or extension of the workload scope on behalf of a client workload. Workload scope updates may, e.g., be controlled using a shared secret passed between workloads.

The HSM may be enabled to control an entitlement of a workload, e.g., to request a generation and/or a use of a cryptographic workload scoped key, using an attention document provided for the client workload. The workload assigning policy may be used for defining requirements and control mechanisms for a generating of cryptographic workload scoped keys and/or for an updating of cryptographic workload scoped keys.

The present subject matter may comprise the following clauses.

Clause 1. A method for enabling a securing of cryptographic operations executed by a stateless hardware security module for a client workload, the method comprising:

receiving by the hardware security module a key generation request from the client workload: receiving by the hardware security module an attestation document for the key generation request signed by a first attestation service using a first cryptographic attestation signing key; verifying by the hardware security module the key generation request and attestation document using a set of one or more pre-defined requirements of a workload assigning policy: upon successful verification of the key generation request and the attestation document for the key generation request, determining by the hardware security module a set of one or more workload requirements for the client workload; generating by the hardware security module a first cryptographic key of the client workload to be used by the hardware security module for providing cryptographic operations for the client workload and encoding the one or more workload requirements as one or more attributes of the generated first cryptographic key of the client workload for assigning a usability of the generated first cryptographic key to cryptographic operation requests by the client workload; and returning by the hardware security module the generated first cryptographic key of the client workload with the one or more attributes of the generated first cryptographic key to the client workload, the generated first cryptographic key of the client workload with the one or more attributes of the generated first cryptographic key being cryptographically secured using a hardware security module key.

Clause 2. The method of clause 1, the first cryptographic key generated for the client workload with the one or more attributes of the generated first cryptographic key being cryptographically secured by encryption using the hardware security module key.

Clause 3. The method of any of the preceding clauses, the one or more workload requirements for the client workload being determined using one or more of the following: the attestation document for the key generation request, the workload assigning policy.

Clause 4. The method of any of the preceding clauses, the attestation document for the key generation request is a machine type ID of a machine, on which the client workload is executed: a check sum of a base image of an execution environment of the client workload: a check sum of a root partition at a moment of a first boot of the execution environment of the client workload, the root partition being used for the first boot: a check sum of a root partition at a build time of the execution environment of the client workload, the root partition being used for building the execution environment: a check sum of a client workload container image comprising the client workload: a geolocation of the machine, on which the client workload is executed: an ID of a cryptographic attestation signature verification key for verifying the signature generated using the first cryptographic attestation signing key; or a certificate for verifying the signature generated using the first cryptographic attestation signing key.

Clause 5. The method of any of the preceding clauses, the workload assigning policy comprising one or more of the following: the ID of the cryptographic attestation signature verification key for verifying the signature generated using the first cryptographic attestation signing key; certificate for verifying the signature generated using the first cryptographic attestation signing key; the cryptographic attestation signature verification key for verifying the signature generated using the first cryptographic attestation signing key; the machine type ID of the machine, on which the client workload is executed: the check sum of the base image of the execution environment of the client workload: the check sum of the root partition at the moment of first boot of the execution environment of the client workload, the root partition being used for the first boot: the check sum of the root partition at the build time of the execution environment of the client workload, the root partition being used for the building of the execution environment: the client workload container image comprising the client workload: the geolocation of the machine, on which the client workload is executed: one or more predefined constraints for using the first cryptographic key generated for the client workload: one or more rules for updating the first cryptographic key generated for the client workload.

Clause 6. The method of any of the preceding clauses, the one or more attributes of the generated first cryptographic key of the client workload comprising one or more of the following: the ID of the cryptographic attestation signature verification key for verifying the signature generated using the first cryptographic attestation signing key; the cryptographic attestation signature verification key for verifying the signature generated using the first cryptographic attestation signing key; the machine type ID of the machine, on which the client workload is executed: the check sum of the base image of the execution environment of the client workload: the check sum of the root partition at the moment of first boot of the execution environment of the client workload, the root partition being used for the first boot: the check sum of the root partition at the build time of the execution environment of the client workload, the root partition being used for the building of the execution environment: the client workload container image comprising the client workload: the geolocation of the machine, on which the client workload is executed: an ID of the generated first cryptographic key of the client workload.

Clause 7. The method of any of the preceding clauses, the method further comprising: receiving by the hardware security module a cryptographic operation request from the client workload, the cryptographic operation request being received together with the first cryptographic key of the client workload and the one or more attributes of the first cryptographic key, which are cryptographically secured using the hardware security module key; receiving by the hardware security module an attestation document for the cryptographic operation request signed by the first attestation service using the first cryptographic attestation signing key; verifying by the hardware security module the cryptographic operation request and the attestation document for the cryptographic operation request using the one or more attributes of the first cryptographic key of the client workload: upon successful verification of the cryptographic operation request and the attestation document for the cryptographic operation request, executing the cryptographic operation requested by the cryptographic operation request using the first cryptographic key of the client workload.

Clause 8. The method of clause 7, the received first cryptographic key of the client workload with the one or more attributes of the first cryptographic key cryptographically secured by encryption using the hardware security module key being decrypted by the hardware security module for usage by the hardware security module.

Clause 9. The method of any of the preceding clauses, the method further comprising: receiving by the hardware security module an update preparation request from the client workload, the update preparation request being received together with the first cryptographic key of the client workload and the one or more attributes of the first cryptographic key, which are cryptographically secured using the hardware security module key; receiving by the hardware security module an attestation document for the update preparation request signed by the first attestation service using the first cryptographic attestation signing key; receiving by the hardware security module an updated attestation document: verifying by the hardware security module the update preparation request and the attestation document for the update preparation request using the one or more attributes of the first cryptographic key of the client workload: determining by the hardware security module a set of one or more updated workload requirements for an updated client workload using the updated attestation document: upon successful verification of the update preparation request and the attestation document for the update preparation request, generating a second cryptographic key of the updated client workload and encoding the one or more updated workload requirements as one or more attributes of the generated second cryptographic key of the updated client workload for assigning a usability of the generated second cryptographic key to cryptographic operation requests by the updated client workload; and returning by the hardware security module the generated second cryptographic key of the updated client workload with the one or more attributes of the generated second cryptographic key to the client workload to be passed on to the updated client workload, the generated second cryptographic key of the client workload with the one or more updated attributes of the generated second cryptographic key being cryptographically secured using the hardware security module key.

Clause 10. The method of clause 9, the received first cryptographic key of the client workload with the one or more attributes of the first cryptographic key cryptographically secured by encryption using the hardware security module key being decrypted by the hardware security module for usage by the hardware security module.

Clause 11. The method of any of preceding clauses 9 to 10, the updated attestation document being an attestation document for an implemented updated client workload signed by a second attestation service using a second cryptographic attestation signing key.

Clause 12. The method of any of preceding clauses 9 to 10, the updated attestation document being a prediction of an attestation document for a prediction of the updated client workload.

Clause 13. The method of any of preceding clauses 9 to 12, the update preparation request from the client workload comprising a shared secret, the shared secret being a secret to be passed on to the updated client workload by the client workload, the shared secret being encoded by the hardware security module as an attribute of the one or more attributes of the generated second cryptographic key of the updated client workload.

Clause 14. The method of any of preceding clauses 9 to 13, the generated second cryptographic key of the updated client workload with the one or more attributes of the generated second cryptographic key being cryptographically secured using the hardware security module key independently of the first cryptographic key of the client workload with the one or more attributes of the first cryptographic key of the client workload.

Clause 15. The method of any of preceding clauses 9 to 13, the generated second cryptographic key of the updated client workload with the one or more attributes of the generated second cryptographic key being cryptographically secured in combination with the first cryptographic key of the client workload with the one or more attributes of the first cryptographic key of the client workload, the combination being configured to be used by the client workload as well as the updated client workload.

Clause 16. The method of clause 15, the method further comprising: receiving by the hardware security module a key update request from the updated client workload, the key update request being received together with the combination of the first cryptographic key of the client workload with the one or more attributes of the first cryptographic key of the client workload and the second cryptographic key of the updated client workload with the one or more attributes of the second cryptographic key of the updated client workload, the combination being cryptographically secured using the hardware security module key; receiving by the hardware security module an attestation document for the key update request signed by the second attestation service using the second cryptographic attestation signing key; verifying by the hardware security module the key update request and the attestation document for the key update preparation request using the one or more attributes of the second cryptographic key of the updated client workload: upon successful verification of the key update request and the attestation document for the key update request, generating a third cryptographic key of the updated client workload and encoding the one or more attributes of the second cryptographic key as one or more attributes of the generated third cryptographic key of the updated client workload for assigning a usability of the generated third cryptographic key to cryptographic operation requests by the updated client workload; and returning by the hardware security module the generated third cryptographic key of the updated client workload with the one or more attributes of the generated third cryptographic key to the updated client workload as a replacement for the combination of the first cryptographic key of the client workload with the one or more attributes of the first cryptographic key of the client workload and the second cryptographic key of the updated client workload with the one or more attributes of the second cryptographic key of the updated client workload, the generated third cryptographic key of the client workload with the one or more attributes of the third cryptographic key being cryptographically secured using the hardware security module key.

Clause 17. The method of clause 16, the received combination of the first cryptographic key of the client workload with the one or more attributes of the first cryptographic key of the client workload and the second cryptographic key of the updated client workload with the one or more attributes of the second cryptographic key of the updated client workload cryptographically secured by encryption using the hardware security module key being decrypted by the hardware security module.

Clause 18. The method of any of the preceding clauses, the method further comprising: receiving by the hardware security module an update enabling request from a secure build server: receiving by the hardware security module an attestation document for the enabling request signed by a third attestation service using a third cryptographic attestation signing key; receiving by the hardware security module an updated attestation document: verifying by the hardware security module the update enabling request and the attestation document for the update enabling request using the set of one or more pre-defined requirements of the workload assigning policy: determining by the hardware security module a set of one or more updated workload requirements for the updated client workload using the updated attestation document: upon successful verification of the update enabling request and the attestation document for the update enabling request, generating the second cryptographic key of the updated client workload and encoding the one or more updated workload requirements as one or more attributes of the generated second cryptographic key of the updated client workload for assigning a usability of the generated second cryptographic key to cryptographic operation requests by the updated client workload; and returning by the hardware security module the generated second cryptographic key of the updated client workload with the one or more attributes of the generated second cryptographic key to the secure build server to be passed on to the updated client workload, the generated second cryptographic key of the client workload with the one or more updated attributes of the generated second cryptographic key being cryptographically secured using the hardware security module key.

Clause 19. A computer program product for enabling a securing of cryptographic operations executed by a stateless hardware security module for a client workload, the computer program product comprising a computer-readable storage medium having computer-readable program code embodied therewith, the computer-readable program code being configured to implement a method comprising: receiving by the hardware security module a key generation request from the client workload: receiving by the hardware security module an attestation document for the key generation request signed by a first attestation service using a first cryptographic attestation signing key; verifying by the hardware security module the key generation request and attestation document using a set of one or more pre-defined requirements of a workload assigning policy: upon successful verification of the key generation request and the attestation document for the key generation request, determining by the hardware security module a set of one or more workload requirements for the client workload: generating by the hardware security module a cryptographic key of the client workload to be used by the hardware security module for providing cryptographic operations for the client workload and encoding the one or more workload requirements as one or more attributes of the generated cryptographic key of the client workload for assigning a usability of the generated cryptographic key to cryptographic operation requests by the client workload; and returning by the hardware security module the generated cryptographic key of the client workload with the one or more attributes of the generated cryptographic key to the client workload, the generated cryptographic key of the client workload with the one or more attributes of the generated cryptographic key being cryptographically secured using a hardware security module key.

Clause 20. A stateless hardware security module for enabling a securing of cryptographic operations executed by the hardware security module for a client workload, the hardware security module being configured for: receiving a key generation request from the client workload: receiving an attestation document for the key generation request signed by a first attestation service using a first cryptographic attestation signing key; verifying the key generation request and attestation document using a set of one or more pre-defined requirements of a workload assigning policy: upon successful verification of the key generation request and the attestation document for the key generation request, determining a set of one or more workload requirements for the client workload: generating a cryptographic key of the client workload to be used by for providing cryptographic operations for the client workload and encoding the one or more workload requirements as one or more attributes of the generated cryptographic key of the client workload for assigning a usability of the generated cryptographic key to cryptographic operation requests by the client workload; and returning the generated cryptographic key of the client workload with the one or more attributes of the generated cryptographic key to the client workload, the generated cryptographic key of the client workload with the one or more attributes of the generated cryptographic key being cryptographically secured using a hardware security module key.

Figure 8:
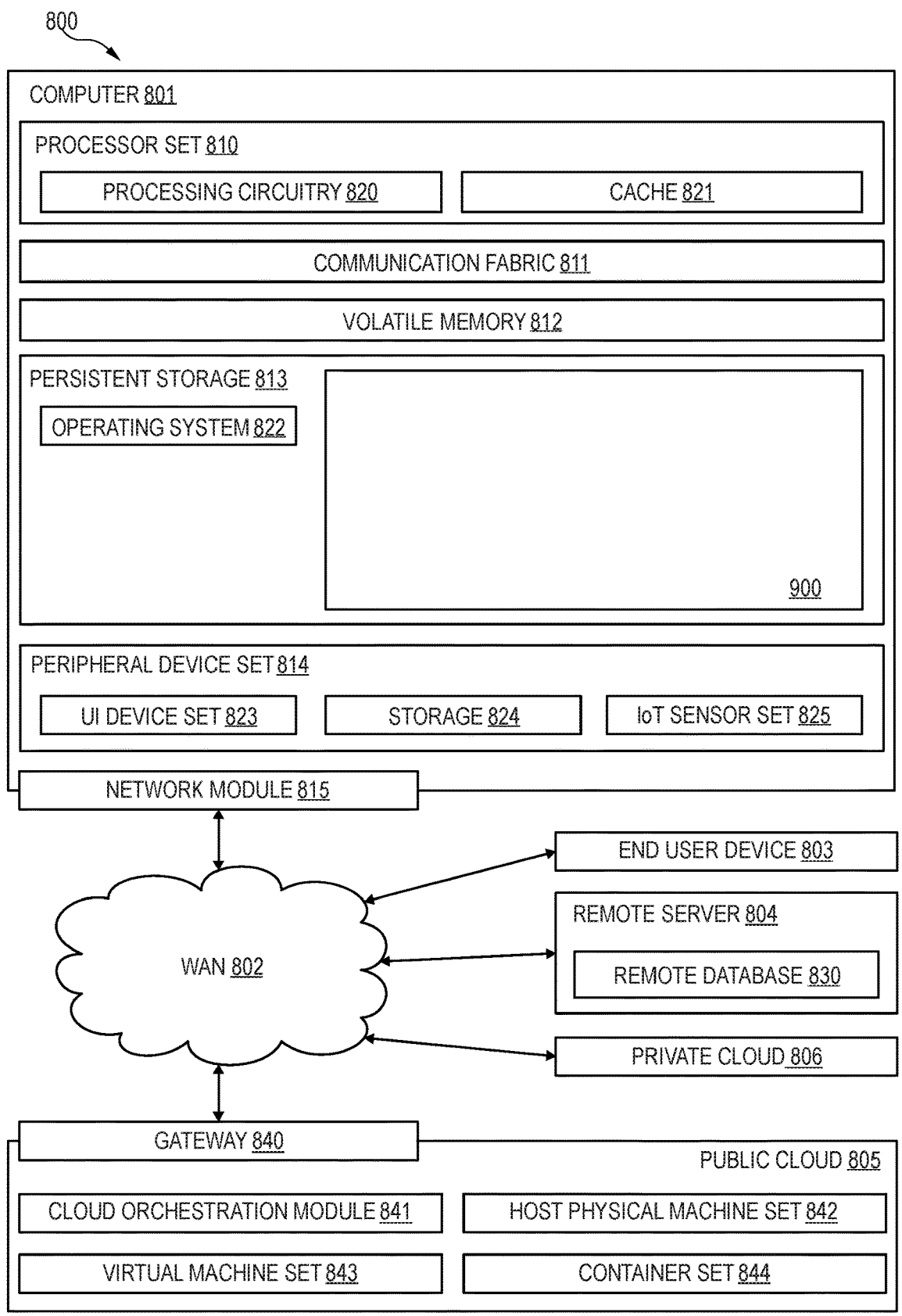
FIG. 8 is a computing environment according to an example of the present subject matter.

Referring now to FIG. 8, illustrative computing environment 800 is depicted. Computing environment 800 contains an example of an environment for the execution of at least some of the computer code involved in performing the inventive methods, such as a table storage code 900. In addition to block 900, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 900, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 900 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 900 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805. The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
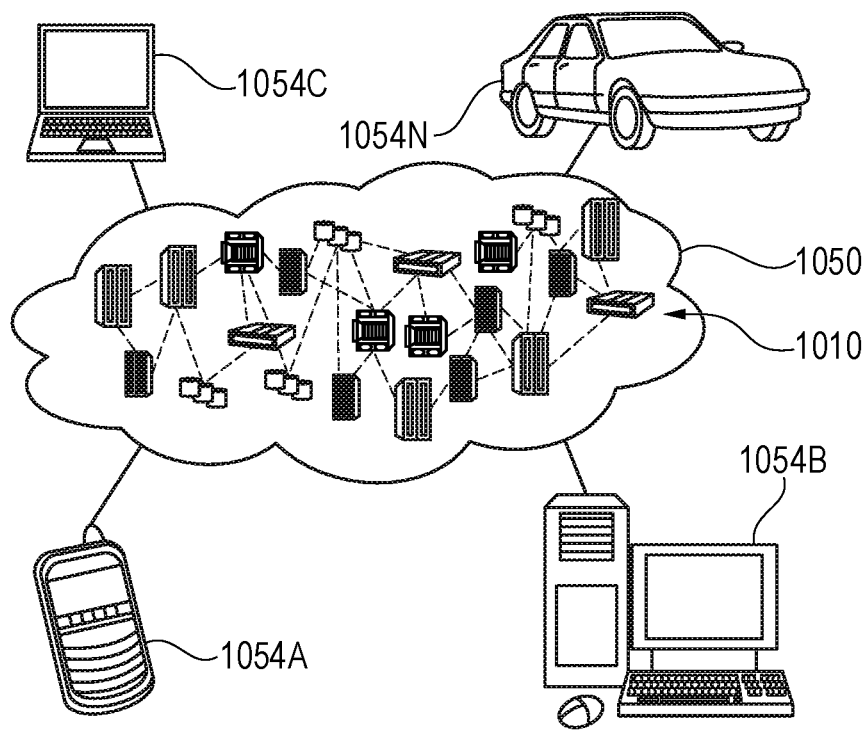
FIG. 9 depicts a cloud computing environment according to an embodiment of the present invention.

Referring now to FIG. 9, illustrative cloud computing environment 1050 is depicted. As shown, cloud computing environment 1050 includes one or more cloud computing nodes 1010 with which local computing devices used by cloud consumers, such as, for example, personal digital assistant (PDA) or cellular telephone 1054A, desktop computer 1054B, laptop computer 1054C, and/or automobile computer system 54N may communicate. Nodes 1010 may communicate with one another. They may be grouped (not shown) physically or virtually, in one or more networks, such as Private, Community, Public, or Hybrid clouds as described hereinabove, or a combination thereof. This allows cloud computing environment 1050 to offer infrastructure, platforms and/or software as services for which a cloud consumer does not need to maintain resources on a local computing device. It is understood that the types of computing devices 1054A-N shown in FIG. 9 are intended to be illustrative only and that computing nodes 1010 and cloud computing environment 1050 can communicate with any type of computerized device over any type of network and/or network addressable connection (e.g., using a web browser).

Figure 10:
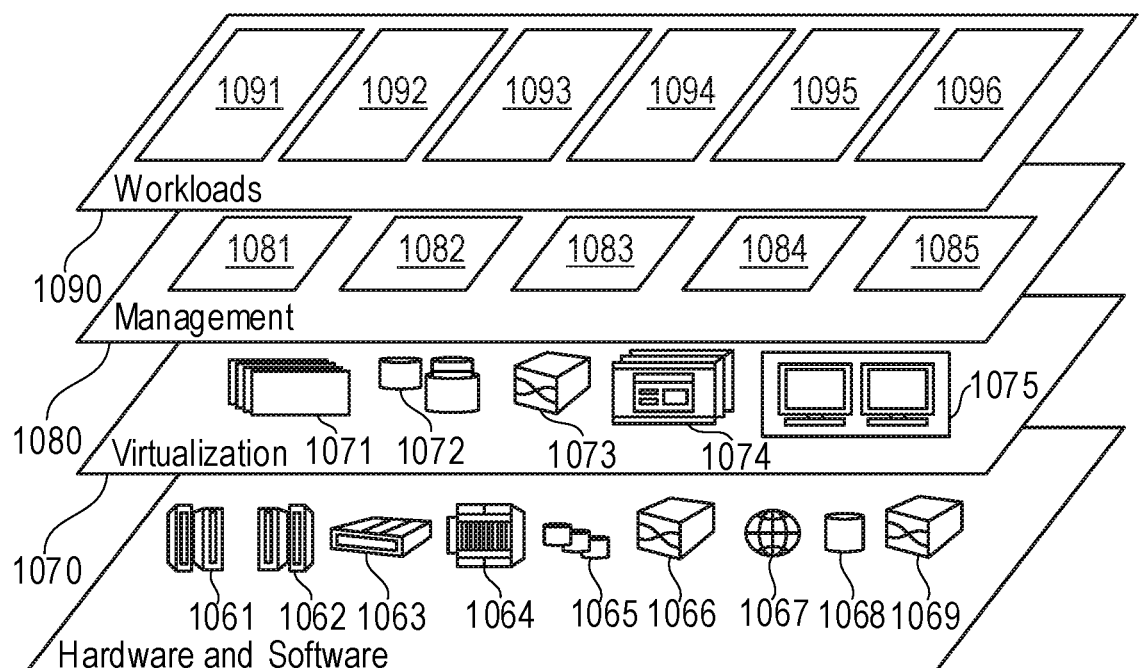
FIG. 10 depicts abstraction model layers according to an embodiment of the present invention.

Referring now to FIG. 10, a set of functional abstraction layers provided by cloud computing environment 1050 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068. Furthermore, the hardware components may comprise crypto hardware 1069 in accordance with the present subject matter, e.g., as described with reference to FIG. 1 or 7, which is configured for executing the method in accordance with the present subject matter, e.g., as described with reference to FIGS. 2 to 6. The crypto hardware 1069 may, e.g., implement a remote stateless HSM.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below: Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and a stateless remote crypto service 1096 using the crypto hardware 1069 in accordance with the present subject matter, e.g., as described with reference to FIGS. 1 to 7.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The invention claimed is:

1. A method for enabling a securing of cryptographic operations executed by a stateless hardware security module for a client workload, the method comprising:
   receiving by a hardware security module a key generation request from the client workload;
   receiving by the hardware security module an attestation document for the key generation request signed by a first attestation service using a first cryptographic attestation signing key;
   verifying by the hardware security module the key generation request and attestation document using a set of one or more pre-defined requirements of a workload assigning policy;
   upon successful verification of the key generation request and the attestation document for the key generation request, determining by the hardware security module a set of one or more workload requirements for the client workload;
   generating by the hardware security module a first cryptographic key of the client workload to be used by the hardware security module for providing cryptographic operations for the client workload and encoding the one or more workload requirements as one or more attributes of the generated first cryptographic key of the client workload for assigning a usability of the generated first cryptographic key to cryptographic operation requests by the client workload; and
   returning by the hardware security module the generated first cryptographic key of the client workload with the one or more attributes of the generated first cryptographic key to the client workload, the generated first cryptographic key of the client workload with the one or more attributes of the generated first cryptographic key being cryptographically secured using a hardware security module key.

2. The method of claim 1, wherein the first cryptographic key generated for the client workload with the one or more attributes of the generated first cryptographic key being cryptographically secured by encryption using the hardware security module key.

3. The method of claim 1, wherein the one or more workload requirements for the client workload being determined using one or more of the following: the attestation document for the key generation request, the workload assigning policy.

4. The method of claim 1, wherein the attestation document for the key generation request is: a machine type ID of a machine, on which the client workload is executed; a check sum of a base image of an execution environment of the client workload; a check sum of a root partition at a moment of a first boot of the execution environment of the client workload, the root partition being used for the first boot; a check sum of a root partition at a build time of the execution environment of the client workload, the root partition being used for building the execution environment; a check sum of a client workload container image comprising the client workload; a geolocation of the machine, on which the client workload is executed; an ID of a cryptographic attestation signature verification key for verifying the signature generated using the first cryptographic attestation signing key; or a certificate for verifying the signature generated using the first cryptographic attestation signing key.

5. The method of claim 1, wherein the workload assigning policy is: an ID of a cryptographic attestation signature verification key for verifying the signature generated using the first cryptographic attestation signing key; certificate for verifying the signature generated using the first cryptographic attestation signing key; the cryptographic attestation signature verification key for verifying the signature generated using the first cryptographic attestation signing key; a machine type ID of the machine, on which the client workload is executed; a check sum of a base image of an execution environment of the client workload; a check sum of a root partition at a moment of first boot of the execution environment of the client workload, the root partition being used for the first boot; a check sum of a root partition at a build time of the execution environment of the client workload, the root partition being used for the building of the execution environment; a client workload container image comprising the client workload; a geolocation of the machine, on which the client workload is executed; one or more predefined constraints for using the first cryptographic key generated for the client workload; or one or more rules for updating the first cryptographic key generated for the client workload.

6. The method of claim 1, wherein the one or more attributes of the generated first cryptographic key of the client workload is: an ID of a cryptographic attestation signature verification key for verifying the signature generated using the first cryptographic attestation signing key; a cryptographic attestation signature verification key for verifying the signature generated using the first cryptographic attestation signing key; a machine type ID of the machine, on which the client workload is executed; a check sum of a base image of an execution environment of the client workload; a check sum of a root partition at a moment of first boot of the execution environment of the client workload, the root partition being used for the first boot; a check sum of a root partition at a build time of the execution environment of the client workload, the root partition being used for the building of the execution environment; a client workload container image comprising the client workload; a geolocation of the machine, on which the client workload is executed; or an ID of the generated first cryptographic key of the client workload.

7. The method of claim 1, the method further comprising:
   receiving by the hardware security module a cryptographic operation request from the client workload, the cryptographic operation request being received together with the first cryptographic key of the client workload and the one or more attributes of the first cryptographic key, which are cryptographically secured using the hardware security module key;

receiving by the hardware security module an attestation document for the cryptographic operation request signed by the first attestation service using the first cryptographic attestation signing key;

verifying by the hardware security module the cryptographic operation request and the attestation document for the cryptographic operation request using the one or more attributes of the first cryptographic key of the client workload; and upon successful verification of the cryptographic operation request and the attestation document for the cryptographic operation request, executing the cryptographic operation requested by the cryptographic operation request using the first cryptographic key of the client workload.

8. The method of claim 1, wherein the received first cryptographic key of the client workload with the one or more attributes of the first cryptographic key cryptographically secured by encryption using the hardware security module key being decrypted by the hardware security module for usage by the hardware security module.

9. The method of claim 1, the method further comprising:
receiving by the hardware security module an update preparation request from the client workload, the update preparation request being received together with the first cryptographic key of the client workload and the one or more attributes of the first cryptographic key, which are cryptographically secured using the hardware security module key;

receiving by the hardware security module an attestation document for the update preparation request signed by the first attestation service using the first cryptographic attestation signing key;

receiving by the hardware security module an updated attestation document;

verifying by the hardware security module the update preparation request and the attestation document for the update preparation request using the one or more attributes of the first cryptographic key of the client workload;

determining by the hardware security module a set of one or more updated workload requirements for an updated client workload using the updated attestation document;

upon successful verification of the update preparation request and the attestation document for the update preparation request, generating a second cryptographic key of the updated client workload and encoding the one or more updated workload requirements as one or more attributes of the generated second cryptographic key of the updated client workload for assigning a usability of the generated second cryptographic key to cryptographic operation requests by the updated client workload; and returning by the hardware security module the generated second cryptographic key of the updated client workload with the one or more attributes of the generated second cryptographic key to the client workload to be passed on to the updated client workload, the generated second cryptographic key of the client workload with the one or more updated attributes of the generated second cryptographic key being cryptographically secured using the hardware security module key.

10. The method of claim 9, wherein the received first cryptographic key of the client workload with the one or more attributes of the first cryptographic key cryptographically secured by encryption using the hardware security module key being decrypted by the hardware security module for usage by the hardware security module.

11. The method of claim 9, wherein the updated attestation document being an attestation document for an implemented updated client workload signed by a second attestation service using a second cryptographic attestation signing key.

12. The method of claim 9, wherein the updated attestation document being a prediction of an attestation document for a prediction of the updated client workload.

13. The method of claim 9, wherein the update preparation request from the client workload comprising a shared secret, the shared secret being a secret to be passed on to the updated client workload by the client workload, the shared secret being encoded by the hardware security module as an attribute of the one or more attributes of the generated second cryptographic key of the updated client workload.

14. The method of claim 9, wherein the generated second cryptographic key of the updated client workload with the one or more attributes of the generated second cryptographic key being cryptographically secured using the hardware security module key independently of the first cryptographic key of the client workload with the one or more attributes of the first cryptographic key of the client workload.

15. The method of claim 9, wherein the generated second cryptographic key of the updated client workload with the one or more attributes of the generated second cryptographic key being cryptographically secured in combination with the first cryptographic key of the client workload with the one or more attributes of the first cryptographic key of the client workload, the combination being configured to be used by the client workload as well as the updated client workload.

16. The method of claim 15, the method further comprising:
receiving by the hardware security module a key update request from the updated client workload, the key update request being received together with the combination of the first cryptographic key of the client workload with the one or more attributes of the first cryptographic key of the client workload and the second cryptographic key of the updated client workload with the one or more attributes of the second cryptographic key of the updated client workload, the combination being cryptographically secured using the hardware security module key;

receiving by the hardware security module an attestation document for the key update request signed by the second attestation service using the second cryptographic attestation signing key;

verifying by the hardware security module the key update request and the attestation document for the key update preparation request using the one or more attributes of the second cryptographic key of the updated client workload;

upon successful verification of the key update request and the attestation document for the key update request, generating a third cryptographic key of the updated client workload and encoding the one or more attributes of the second cryptographic key as one or more attributes of the generated third cryptographic key of the updated client workload for assigning a usability of the generated third cryptographic key to cryptographic operation requests by the updated client workload; and returning by the hardware security module the generated third cryptographic key of the updated client workload with the one or more attributes of the generated third cryptographic key to the updated client workload as a replacement for the combination of the first cryptographic key of the client workload with the one or more attributes of the first cryptographic key of the client workload and the second cryptographic key of the updated client workload with the one or more attributes of the second cryptographic key of the updated client workload, the generated third cryptographic key of the client workload with the one or more attributes of the third cryptographic key being cryptographically secured using the hardware security module key.

17. The method of claim 16, wherein the received combination of the first cryptographic key of the client workload with the one or more attributes of the first cryptographic key of the client workload and the second cryptographic key of the updated client workload with the one or more attributes of the second cryptographic key of the updated client workload cryptographically secured by encryption using the hardware security module key being decrypted by the hardware security module.

18. The method of claim 1, the method further comprising:
receiving by the hardware security module an update enabling request from a secure build server;
receiving by the hardware security module an attestation document for the enabling request signed by a third attestation service using a third cryptographic attestation signing key;
receiving by the hardware security module an updated attestation document;
verifying by the hardware security module the update enabling request and the attestation document for the update enabling request using the set of one or more pre-defined requirements of the workload assigning policy;
determining by the hardware security module a set of one or more updated workload requirements for an updated client workload using the updated attestation document;
upon successful verification of the update enabling request and the attestation document for the update enabling request, generating a second cryptographic key of the updated client workload and encoding the one or more updated workload requirements as one or more attributes of the generated second cryptographic key of the updated client workload for assigning a usability of the generated second cryptographic key to cryptographic operation requests by the updated client workload; and
returning by the hardware security module the generated second cryptographic key of the updated client workload with the one or more attributes of the generated second cryptographic key to the secure build server to be passed on to the updated client workload, the generated second cryptographic key of the client workload with the one or more updated attributes of the generated second cryptographic key being cryptographically secured using the hardware security module key.

19. A computer program product for enabling a securing of cryptographic operations executed by a stateless hardware security module for a client workload, the computer program product comprising a computer-readable storage medium having computer-readable program code embodied therewith, the computer-readable program code being configured to implement a method comprising:
receiving by a hardware security module a key generation request from the client workload;
receiving by the hardware security module an attestation document for the key generation request signed by a first attestation service using a first cryptographic attestation signing key;
verifying by the hardware security module the key generation request and attestation document using a set of one or more pre-defined requirements of a workload assigning policy;
upon successful verification of the key generation request and the attestation document for the key generation request, determining by the hardware security module a set of one or more workload requirements for the client workload;
generating by the hardware security module a cryptographic key of the client workload to be used by the hardware security module for providing cryptographic operations for the client workload and encoding the one or more workload requirements as one or more attributes of the generated cryptographic key of the client workload for assigning a usability of the generated cryptographic key to cryptographic operation requests by the client workload; and
returning by the hardware security module the generated cryptographic key of the client workload with the one or more attributes of the generated cryptographic key to the client workload, the generated cryptographic key of the client workload with the one or more attributes of the generated cryptographic key being cryptographically secured using a hardware security module key.

20. A stateless hardware security module for enabling a securing of cryptographic operations executed by the hardware security module for a client workload, the hardware security module being configured for:
receiving a key generation request from the client workload;
receiving an attestation document for the key generation request signed by a first attestation service using a first cryptographic attestation signing key;
verifying the key generation request and attestation document using a set of one or more pre-defined requirements of a workload assigning policy;
upon successful verification of the key generation request and the attestation document for the key generation request, determining a set of one or more workload requirements for the client workload;
generating a cryptographic key of the client workload to be used by for providing cryptographic operations for the client workload and encoding the one or more workload requirements as one or more attributes of the generated cryptographic key of the client workload for assigning a usability of the generated cryptographic key to cryptographic operation requests by the client workload; and
returning the generated cryptographic key of the client workload with the one or more attributes of the generated cryptographic key to the client workload, the generated cryptographic key of the client workload with the one or more attributes of the generated cryptographic key being cryptographically secured using a hardware security module key.

* * * * *